(12) United States Patent
Rief et al.

(10) Patent No.: US 8,784,652 B2
(45) Date of Patent: Jul. 22, 2014

(54) SWIMMING POOL CLEANER WITH A RIGID DEBRIS CANISTER

(75) Inventors: Manuela Rief, Santa Rosa, CA (US); Dieter J. Rief, Santa Rosa, CA (US)

(73) Assignee: Poolvergnuegen, Santa Rosa, CA (US)

( * ) Notice: Subject to any disclaimer, the term of this patent is extended or adjusted under 35 U.S.C. 154(b) by 655 days.

(21) Appl. No.: 12/890,069

(22) Filed: Sep. 24, 2010

(65) Prior Publication Data

US 2012/0074050 A1    Mar. 29, 2012

(51) Int. Cl.
*E04H 4/16* (2006.01)
*C02F 103/42* (2006.01)

(52) U.S. Cl.
CPC .......... *E04H 4/1654* (2013.01); *C02F 2103/42* (2013.01)
USPC .......................... 210/167.16; 210/232; 15/1.7

(58) Field of Classification Search
CPC ........................... E04H 4/1654; C02F 2103/42
USPC ...................... 210/167.16, 232, 242.1; 15/1.7
See application file for complete search history.

(56) References Cited

U.S. PATENT DOCUMENTS

| | | |
|---|---|---|
| 389,790 A | 9/1888 | Boutell |
| 1,639,170 A | 8/1927 | Fell |
| D144,063 S | 3/1946 | McAllister |
| D175,210 S | 7/1955 | Dreyfuss |
| D176,635 S | 1/1956 | Shalvoy |
| 2,751,038 A | 6/1956 | Acheson |
| D186,872 S | 12/1959 | Swann |
| 3,039,122 A | 6/1962 | Birdsall |
| 3,310,173 A | 3/1967 | Sosower |
| 3,321,787 A | 5/1967 | Myers |
| 3,324,492 A | 6/1967 | Myers |
| 3,337,889 A | 8/1967 | West |

(Continued)

FOREIGN PATENT DOCUMENTS

| | | |
|---|---|---|
| AU | 704603 | 1/1997 |
| DE | 3110203 | 9/1982 |

(Continued)

OTHER PUBLICATIONS

Tiger Shark Owner's Manual (Mar. 2007) (16 pages) Exact Date Unknown.

(Continued)

*Primary Examiner* — Fred Prince
(74) *Attorney, Agent, or Firm* — McCarter & English, LLP

(57) ABSTRACT

A swimming pool cleaner of the type movable along an underwater pool surface to clean debris therefrom. The pool cleaner includes a body having a debris inlet and a debris outlet. A rigid debris-collection canister is secured to the body over the debris outlet to collect debris in the rigid canister and pass filtered water either back into the pool or to a remote suction system such that the collected debris remain at the pool-cleaner body for easy maintenance while allowing free flow of water through the rigid canister. The rigid canister is shaped to minimize obstructions to the pool cleaner movement in the pool by providing improved buoyancy and limiting entrapment of the cleaner by underwater pool structures. The cleaner body is adapted for securement of either a water-suction hose connected to a remote suction system or a venturi-line structure connected to a water-flow line fed by a remote pump such that the pool cleaner is interchangeably usable as a suction cleaner and as a pressure cleaner.

26 Claims, 19 Drawing Sheets

(56) References Cited

U.S. PATENT DOCUMENTS

| | | |
|---|---|---|
| 3,347,386 A | 10/1967 | Kraissl, Jr. |
| 3,439,368 A | 4/1969 | Myers |
| RE26,741 E | 12/1969 | Myers |
| 3,551,930 A | 1/1971 | Myers |
| 3,665,942 A | 5/1972 | Moore |
| 3,688,908 A | 9/1972 | Myers et al. |
| 3,689,408 A | 9/1972 | Edmiston et al. |
| 3,767,055 A | 10/1973 | Flatland |
| 3,794,052 A | 2/1974 | Koble, Jr. et al. |
| 3,797,508 A | 3/1974 | Jacobs |
| 3,805,815 A | 4/1974 | Goodin |
| 3,822,754 A | 7/1974 | Henkin et al. |
| 3,868,739 A | 3/1975 | Hargrave |
| 3,886,616 A * | 6/1975 | Hayes ............... 15/1.7 |
| 3,921,654 A | 11/1975 | Pansini |
| 3,936,899 A | 2/1976 | Henkin et al. |
| 3,972,339 A | 8/1976 | Henkin et al. |
| 3,979,788 A | 9/1976 | Strausak |
| 4,009,675 A | 3/1977 | Zöllner et al. |
| 4,040,864 A | 8/1977 | Steeves |
| 4,100,641 A * | 7/1978 | Pansini ............... 15/1.7 |
| 4,106,157 A | 8/1978 | Baker |
| 4,152,802 A | 5/1979 | Chauvier |
| 4,154,680 A | 5/1979 | Sommer |
| 4,156,948 A | 6/1979 | Chauvier et al. |
| 4,168,557 A | 9/1979 | Rasch et al. |
| 4,193,156 A | 3/1980 | Chauvier |
| 4,240,174 A | 12/1980 | Thiem et al. |
| 4,281,995 A | 8/1981 | Pansini |
| 4,306,329 A | 12/1981 | Yokoi |
| D264,797 S | 6/1982 | Burglin et al. |
| 4,338,697 A | 7/1982 | Broadwater |
| 4,351,077 A | 9/1982 | Hofmann |
| 4,402,101 A | 9/1983 | van Zyl |
| 4,431,538 A | 2/1984 | Selsted |
| 4,533,945 A | 8/1985 | Lauvray et al. |
| 4,558,479 A | 12/1985 | Greskovics et al. |
| 4,575,423 A | 3/1986 | Alanis et al. |
| 4,589,986 A | 5/1986 | Greskovics et al. |
| 4,618,420 A | 10/1986 | Alanis |
| 4,626,358 A | 12/1986 | Fetsko |
| 4,645,593 A | 2/1987 | Dunk et al. |
| 4,651,376 A | 3/1987 | Ford |
| 4,652,366 A | 3/1987 | Brooks |
| 4,692,956 A | 9/1987 | Kassis |
| 4,761,848 A | 8/1988 | Hofmann |
| 4,768,532 A | 9/1988 | Johnson |
| 4,769,867 A | 9/1988 | Stoltz |
| 4,776,953 A | 10/1988 | Frentzel |
| 4,776,954 A | 10/1988 | Brooks |
| 4,778,599 A | 10/1988 | Brooks |
| 4,802,592 A | 2/1989 | Wessels |
| 4,807,318 A | 2/1989 | Kallenbach |
| 4,839,063 A | 6/1989 | Brooks |
| 4,849,024 A | 7/1989 | Supra |
| D304,505 S | 11/1989 | Maier et al. |
| 4,950,393 A | 8/1990 | Goettl |
| 4,959,146 A | 9/1990 | Kristan |
| 4,962,559 A | 10/1990 | Schuman |
| 4,988,437 A | 1/1991 | Gefter et al. |
| 4,994,178 A | 2/1991 | Brooks |
| D315,624 S | 3/1991 | Kimura et al. |
| 5,014,382 A | 5/1991 | Kallenbach |
| 5,093,950 A | 3/1992 | Heier |
| 5,099,535 A | 3/1992 | Chauvier et al. |
| D325,452 S | 4/1992 | Gefter |
| D325,796 S | 4/1992 | Kallenbach |
| 5,105,496 A | 4/1992 | Gray, Jr. et al. |
| 5,133,503 A | 7/1992 | Giordano et al. |
| 5,133,854 A | 7/1992 | Horvath |
| D328,778 S | 8/1992 | Gefter et al. |
| 5,143,605 A | 9/1992 | Masciarelli |
| D330,582 S | 10/1992 | Gefter et al. |
| 5,169,236 A | 12/1992 | Iest |
| 5,172,445 A | 12/1992 | Chandler |
| 5,197,158 A | 3/1993 | Moini |
| 5,226,205 A | 7/1993 | Pearce |
| 5,265,297 A | 11/1993 | Gould et al. |
| 5,269,913 A | 12/1993 | Atkins |
| D346,888 S | 5/1994 | Stone |
| D349,150 S | 7/1994 | Ruiz |
| 5,329,648 A | 7/1994 | Davey |
| 5,337,434 A | 8/1994 | Erlich |
| 5,338,446 A | 8/1994 | Schuman et al. |
| 5,342,513 A | 8/1994 | Wall et al. |
| 5,351,355 A | 10/1994 | Chiniara |
| 5,352,358 A | 10/1994 | Davey |
| 5,364,512 A | 11/1994 | Earl |
| 5,398,362 A | 3/1995 | Chauvier |
| 5,412,826 A | 5/1995 | Raubenheimer |
| 5,435,031 A | 7/1995 | Minami et al. |
| D361,178 S | 8/1995 | Piret |
| 5,450,644 A | 9/1995 | Berman |
| 5,450,645 A | 9/1995 | Atkins |
| 5,454,129 A | 10/1995 | Kell |
| 5,507,058 A | 4/1996 | Minami et al. |
| 5,507,068 A | 4/1996 | Fan et al. |
| D373,230 S | 8/1996 | Sebor et al. |
| 5,546,982 A | 8/1996 | Clark et al. |
| 5,554,277 A * | 9/1996 | Rief et al. ............ 210/94 |
| 5,569,371 A | 10/1996 | Perling |
| D375,592 S | 11/1996 | Ljunggren |
| D376,450 S | 12/1996 | Campbell et al. |
| 5,603,135 A | 2/1997 | Jones et al. |
| 5,604,950 A | 2/1997 | Stern |
| 5,617,600 A | 4/1997 | Frattini |
| 5,634,229 A | 6/1997 | Stoltz |
| 5,645,721 A | 7/1997 | Carroll, Jr. |
| D384,782 S | 10/1997 | Gefter |
| 5,681,110 A | 10/1997 | Burzacchi |
| 5,720,068 A | 2/1998 | Clark et al. |
| 5,771,987 A | 6/1998 | Marbach |
| 5,788,850 A | 8/1998 | Tuomey |
| 5,802,653 A | 9/1998 | Roumagnac |
| 5,810,999 A | 9/1998 | Bachand et al. |
| D400,319 S | 10/1998 | Hofheins et al. |
| 5,830,350 A | 11/1998 | Voss et al. |
| 5,842,243 A * | 12/1998 | Horvath et al. ............ 15/1.7 |
| 5,863,425 A | 1/1999 | Herlehy et al. |
| 5,882,512 A * | 3/1999 | Denkewicz et al. ..... 210/167.11 |
| D408,104 S | 4/1999 | Adam |
| 5,893,188 A | 4/1999 | Campbell et al. |
| 5,930,856 A | 8/1999 | Van Der Meyden et al. |
| 5,933,899 A | 8/1999 | Campbell et al. |
| 5,935,179 A | 8/1999 | Kleiner et al. |
| 5,961,822 A | 10/1999 | Polimeni, Jr. |
| 417,322 A | 11/1999 | Hollinger |
| 5,985,156 A | 11/1999 | Henkin et al. |
| 5,996,906 A | 12/1999 | Cooper |
| 6,003,184 A | 12/1999 | Campbell et al. |
| 418,640 A | 1/2000 | Veloskey et al. |
| 6,013,178 A | 1/2000 | Strano et al. |
| D421,512 S | 3/2000 | Campbell |
| 6,039,886 A | 3/2000 | Henkin et al. |
| 6,049,933 A | 4/2000 | McLaughlin |
| 6,090,219 A | 7/2000 | Henkin et al. |
| 430,368 A | 8/2000 | Porat et al. |
| 6,094,764 A | 8/2000 | Veloskey et al. |
| 6,099,658 A | 8/2000 | Porat |
| 430,960 A | 9/2000 | van der Meyden et al. |
| 430,962 A | 9/2000 | Porat et al. |
| 6,112,354 A | 9/2000 | Stoltz et al. |
| 6,115,864 A | 9/2000 | Davidsson et al. |
| 6,119,293 A | 9/2000 | Phillipson et al. |
| 6,119,707 A | 9/2000 | Jordan |
| 6,125,492 A | 10/2000 | Prowse |
| 433,545 A | 11/2000 | Hollinger et al. |
| 6,155,657 A | 12/2000 | Erlich et al. |
| D436,700 S | 1/2001 | Forbes et al. |
| 6,193,885 B1 | 2/2001 | Campbell |
| 6,200,487 B1 | 3/2001 | Denkewicz, Jr. et al. |
| 6,206,547 B1 | 3/2001 | Erlich |
| 6,212,725 B1 | 4/2001 | Porat |
| 6,238,553 B1 | 5/2001 | Lin |

(56) References Cited

U.S. PATENT DOCUMENTS

| | | | |
|---|---|---|---|
| D445,225 S | 7/2001 | Schaub | |
| 6,280,611 B1 | 8/2001 | Henkin et al. | |
| 6,294,084 B1 | 9/2001 | Henkin et al. | |
| 6,299,699 B1 | 10/2001 | Porat et al. | |
| 6,309,468 B1 | 10/2001 | Sommer | |
| 6,311,353 B1 | 11/2001 | Phillipson et al. | |
| 6,357,478 B1 | 3/2002 | Campbell et al. | |
| 6,365,039 B1 | 4/2002 | Henkin et al. | |
| 6,387,250 B1 | 5/2002 | Henkin et al. | |
| 6,398,878 B1 | 6/2002 | Henkin et al. | |
| 6,409,916 B1 | 6/2002 | Zelas et al. | |
| 6,412,133 B1 | 7/2002 | Erlich et al. | |
| D463,889 S | 10/2002 | Buzzi | |
| 6,473,927 B1 | 11/2002 | Sommer | |
| 6,485,638 B2 * | 11/2002 | Henkin et al. | 210/143 |
| D469,589 S | 1/2003 | Wichmann et al. | |
| 6,502,269 B1 | 1/2003 | Balchan et al. | |
| D471,330 S | 3/2003 | Campbell | |
| D474,312 S | 5/2003 | Stephens et al. | |
| 6,564,417 B2 | 5/2003 | Porat | |
| 6,601,255 B1 | 8/2003 | van der Meyden et al. | |
| 6,627,074 B2 | 9/2003 | Lincke | |
| D481,181 S | 10/2003 | Lath et al. | |
| 6,645,375 B2 | 11/2003 | Henkin et al. | |
| 6,652,742 B2 | 11/2003 | Henkin et al. | |
| 6,665,900 B2 | 12/2003 | Wichmann et al. | |
| RE38,479 E | 3/2004 | Henkin et al. | |
| 6,725,489 B1 | 4/2004 | Zell | |
| 6,740,233 B2 | 5/2004 | Stoltz et al. | |
| 6,742,613 B2 | 6/2004 | Erlich et al. | |
| 6,751,822 B2 | 6/2004 | Phillipson et al. | |
| 6,758,226 B2 | 7/2004 | Porat | |
| 6,802,963 B2 | 10/2004 | Campbell | |
| 6,815,918 B2 | 11/2004 | Porat et al. | |
| 6,842,931 B2 | 1/2005 | Porat et al. | |
| 6,886,205 B1 | 5/2005 | Pichon | |
| 6,942,790 B1 | 9/2005 | Dolton | |
| 6,954,960 B2 | 10/2005 | Pichon | |
| 6,965,814 B2 | 11/2005 | Hadari | |
| 6,971,136 B2 | 12/2005 | Horvath et al. | |
| 6,979,400 B2 | 12/2005 | Bauckman et al. | |
| 7,001,159 B2 | 2/2006 | Peterson, Jr. et al. | |
| 7,039,980 B2 | 5/2006 | Van Der Meyden et al. | |
| D524,495 S | 7/2006 | Ljunggren | |
| D526,101 S | 8/2006 | Blanc-Tailleur | |
| 7,089,876 B2 | 8/2006 | Porat | |
| 7,103,449 B2 | 9/2006 | Woo et al. | |
| D529,669 S | 10/2006 | Blanc-Tailleur | |
| 7,117,554 B2 * | 10/2006 | Pichon | 15/1.7 |
| 7,118,632 B2 | 10/2006 | Sumonthee | |
| 7,118,678 B2 | 10/2006 | Porat | |
| 7,143,502 B2 | 12/2006 | Porat et al. | |
| 7,145,074 B2 | 12/2006 | Henkin et al. | |
| 7,165,284 B2 | 1/2007 | Erlich et al. | |
| D537,576 S | 2/2007 | Koury et al. | |
| 7,207,604 B2 | 4/2007 | Wilson | |
| 7,208,083 B2 | 4/2007 | Meritt-Powell | |
| 7,213,287 B2 | 5/2007 | Hui | |
| D550,906 S | 9/2007 | Fritz et al. | |
| 7,273,546 B2 | 9/2007 | Meritt-Powell | |
| 7,316,751 B2 | 1/2008 | Horvath et al. | |
| 7,318,448 B2 | 1/2008 | Fleischer et al. | |
| 7,395,571 B2 | 7/2008 | Van Der Meijden et al. | |
| D575,915 S | 8/2008 | Dreyer | |
| 7,501,056 B2 | 3/2009 | Henkin et al. | |
| 7,504,025 B2 | 3/2009 | Burgassi | |
| 7,507,332 B2 | 3/2009 | Henkin et al. | |
| 7,515,991 B2 | 4/2009 | Egawa et al. | |
| 7,543,607 B2 | 6/2009 | Henkin et al. | |
| D598,168 S | 8/2009 | Sumonthee | |
| 7,575,675 B2 | 8/2009 | Gopalan | |
| D599,967 S | 9/2009 | Blanc-Tailleur | |
| 7,661,381 B2 | 2/2010 | Gorelik et al. | |
| 7,677,268 B2 | 3/2010 | Griffin et al. | |
| 7,682,461 B2 | 3/2010 | Sommer et al. | |
| 7,690,066 B2 | 4/2010 | Stoltz et al. | |
| 7,721,370 B2 | 5/2010 | Gopalan | |
| 7,723,934 B2 | 5/2010 | Adam et al. | |
| 7,786,381 B2 | 8/2010 | Henkin et al. | |
| 7,827,643 B2 | 11/2010 | Erlich et al. | |
| D630,808 S | 1/2011 | Dye et al. | |
| D630,809 S | 1/2011 | Dye et al. | |
| 7,900,308 B2 | 3/2011 | Erlich et al. | |
| 7,908,697 B2 | 3/2011 | Lavabre et al. | |
| 8,393,033 B2 * | 3/2013 | Pichon et al. | 15/1.7 |
| 2002/0104790 A1 * | 8/2002 | Lincke | 210/169 |
| 2002/0116772 A1 | 8/2002 | Phillipson et al. | |
| 2003/0177594 A1 | 9/2003 | Van Der Meyden et al. | |
| 2004/0007522 A1 | 1/2004 | Garti | |
| 2004/0021439 A1 | 2/2004 | Porat et al. | |
| 2004/0025268 A1 | 2/2004 | Porat et al. | |
| 2004/0074524 A1 | 4/2004 | Horvath et al. | |
| 2004/0216251 A1 | 11/2004 | Van Der Meijden et al. | |
| 2005/0029177 A1 | 2/2005 | Peterson et al. | |
| 2005/0123408 A1 | 6/2005 | Koehl | |
| 2005/0262652 A1 | 12/2005 | Sumonthee | |
| 2005/0279682 A1 | 12/2005 | Davidson et al. | |
| 2006/0054229 A1 | 3/2006 | van der Meijden et al. | |
| 2006/0059637 A1 | 3/2006 | Fridman et al. | |
| 2006/0085929 A1 | 4/2006 | Deklinski | |
| 2006/0101596 A1 | 5/2006 | Hui et al. | |
| 2006/0177325 A1 | 8/2006 | Peterson, Jr. et al. | |
| 2006/0207041 A1 | 9/2006 | Van Der Meyden et al. | |
| 2006/0225768 A1 | 10/2006 | Erlich et al. | |
| 2007/0028405 A1 | 2/2007 | Garti | |
| 2007/0056124 A1 | 3/2007 | Wichmann et al. | |
| 2007/0067930 A1 | 3/2007 | Garti | |
| 2007/0094817 A1 | 5/2007 | Stoltz et al. | |
| 2007/0251032 A1 | 11/2007 | Pichon et al. | |
| 2007/0251859 A1 | 11/2007 | Zhu | |
| 2007/0272274 A1 | 11/2007 | Adam et al. | |
| 2008/0030061 A1 | 2/2008 | Pejathaya | |
| 2008/0060984 A1 | 3/2008 | Henkin et al. | |
| 2008/0078039 A1 | 4/2008 | Katz | |
| 2008/0087299 A1 | 4/2008 | Erlich et al. | |
| 2008/0099409 A1 | 5/2008 | Gorelik et al. | |
| 2008/0128343 A1 | 6/2008 | Garti | |
| 2008/0202997 A1 | 8/2008 | Davidson et al. | |
| 2008/0222821 A1 | 9/2008 | Pichon | |
| 2008/0235887 A1 | 10/2008 | Horvath et al. | |
| 2008/0236628 A1 | 10/2008 | Horvath et al. | |
| 2008/0276388 A1 | 11/2008 | Dodd | |
| 2009/0045110 A1 | 2/2009 | Garti | |
| 2009/0232701 A1 | 9/2009 | Porat | |
| 2009/0255069 A1 | 10/2009 | Hui | |
| 2009/0282627 A1 | 11/2009 | Porat | |
| 2009/0301522 A1 | 12/2009 | Abehasera et al. | |
| 2010/0011521 A1 | 1/2010 | Collins | |
| 2010/0043154 A1 | 2/2010 | Kellogg | |
| 2010/0058546 A1 | 3/2010 | Erlich | |
| 2010/0065482 A1 | 3/2010 | Sumonthee | |
| 2010/0122422 A1 | 5/2010 | Hui | |
| 2010/0132136 A1 | 6/2010 | Sommer et al. | |
| 2010/0306931 A1 | 12/2010 | Garti | |
| 2011/0000030 A1 | 1/2011 | Pichon et al. | |
| 2011/0000031 A1 | 1/2011 | Pichon et al. | |
| 2011/0000032 A1 | 1/2011 | Pichon et al. | |
| 2011/0000033 A1 | 1/2011 | Pichon et al. | |
| 2011/0000034 A1 | 1/2011 | Pichon et al. | |
| 2011/0000035 A1 | 1/2011 | Pichon et al. | |
| 2011/0000036 A1 | 1/2011 | Pichon et al. | |
| 2011/0005009 A1 | 1/2011 | Pichon et al. | |
| 2011/0016646 A1 | 1/2011 | Pichon et al. | |
| 2011/0020139 A1 | 1/2011 | Pichon et al. | |
| 2011/0023247 A1 | 2/2011 | Pichon et al. | |
| 2011/0047727 A1 | 3/2011 | Pichon et al. | |
| 2011/0067729 A1 | 3/2011 | Erlich et al. | |
| 2011/0088182 A1 | 4/2011 | Hui | |
| 2011/0154585 A1 | 6/2011 | Mastio et al. | |
| 2011/0154586 A1 | 6/2011 | Mastio et al. | |
| 2011/0155186 A1 | 6/2011 | Mastio et al. | |
| 2011/0162683 A1 | 7/2011 | Mastio et al. | |
| 2011/0197932 A1 | 8/2011 | Mastio et al. | |

(56) References Cited

U.S. PATENT DOCUMENTS

| | | |
|---|---|---|
| 2011/0203060 A1 | 8/2011 | Pichon et al. |
| 2011/0302728 A1 | 12/2011 | Sumonthee |
| 2012/0103365 A1 | 5/2012 | Sumonthee |

FOREIGN PATENT DOCUMENTS

| | | |
|---|---|---|
| EP | 0314259 | 5/1989 |
| EP | 0426365 | 5/1991 |
| EP | 0468876 | 1/1992 |
| EP | 0657603 | 6/1995 |
| EP | 0990749 | 4/2000 |
| EP | 1122382 | 8/2001 |
| EP | 0990750 | 2/2007 |
| EP | 1785552 | 5/2007 |
| EP | 1921229 | 5/2008 |
| EP | 1489249 | 9/2008 |
| EP | 1849934 | 9/2009 |
| FR | 2584442 | 1/1987 |
| FR | 2693499 | 1/1994 |
| FR | 2729995 | 8/1996 |
| FR | 2864129 | 6/2005 |
| WO | WO 87/00883 | 2/1987 |
| WO | WO 90/09498 | 8/1990 |
| WO | WO 99/63185 | 12/1999 |
| WO | WO 03/085225 | 10/2003 |
| WO | WO 2005/007998 | 1/2005 |
| WO | WO 2005/118984 | 12/2005 |
| WO | WO 2006/109118 | 10/2006 |
| WO | WO2006/121808 | 11/2006 |
| WO | WO2007/055960 | 5/2007 |

OTHER PUBLICATIONS

Digital Image of Squirrel Cleaner (more than one year prior to Sep. 16, 2008) (1 page) Exact Date Unknown.
Digital Image of Pool Rover Cleaner (more than one year prior to Sep. 16, 2008) (1 page) Exact Date Unknown.
Digital Image of Robby Cleaner (more than one year prior to Sep. 16, 2008) (1 page) Exact Date Unknown.
Digital Image of Dolphin Cleaner (more than one year prior to Sep. 16, 2008) (1 page) Exact Date Unknown.
Digital Image of Merlin Cleaner (more than one year prior to Sep. 16, 2008) (1 page) Exact Date Unknown.
Digital Image of Aquabot Cleaner (more than one year prior to Sep. 16, 2008) (1 page) Exact Date Unknown.
Dolphin Cleaner photos (3 pages) and Dolphin Cleaner page (2 pages) (Cleaner seen at a show circa Oct. 2009) Exact Date Unknown.
Zodiac Cybernaut Manual (dated Sep. 3, 2006) (6 pages).
Polaris 9300 and Vortex 3 Cleaners (manuals dated Copyright 2010 and V3 cleaner seen at a show circa Oct. 2009) (125 pages) Exact Date Unknown.
Hexagone Cleaners (more than one year prior to Sep. 16, 2008) (8 pages).
Caratti Catalog (dated 2007) (8 pages).
Brock Catalog (dated 2005) (8 pages).
Dolphin Dx2 Hybrid Advertisement (dated 2009) (2 pages).
DX3 and DX4 Cleaners and Related Manuals (more than one year prior to Sep. 16, 2008) (17 pages) Exact Date Unknown.
Picture Sheet Showing Multiple Commercial Cleaners (more than one year prior to Sep. 16, 2008) (1 page) Exact Date Unknown.
Picture Sheet Showing Multiple Double-Wide Cleaners (more than one year prior to Sep. 16, 2008) (1 page) Exact Date Unknown.
Smartpool Nitro Cleaner Manual (more than one year prior to Sep. 16, 2008) (56 pages) Exact Date Unknown.
AquaBot Advertisement, Pool & Spa News (Oct. 2009) (2 pages).
Wave Cleaner (cleaner seen at show circa Oct./Nov. 2008) (25 pages) Exact Date Unknown.
U.S. Appl. No. 29/378,304 entitled "Pool Cleaner", filed on Nov. 2, 2010 (7 pages).
Office Action mailed Feb. 14, 2011 in connection with U.S. Appl. No. 12/211,720 (7 pages).
Response filed Aug. 15, 2011 in connection with U.S. Appl. No. 12/211,720 (11 pages).
Dolphin 2x2 (more than one year prior to Sep. 16, 2008) (8 pages).
Cleaner shown at archive.org, link for Apr. 4, 2007 (2 sheets): http://web.archive.org/web/20070404093845/http:/www.mariner-3s.com/mariner_en/produkte/navigator/navigator.php.
Hayward Tiger Shark Series Owner's Manual (16 pages) (more than one year prior to Nov. 2, 2009).
U.S. Appl. No. 12/938,041 entitled "Pool Cleaning Device with Adjustable Buoyant Element", filed on Nov. 2, 2010 (99 pages) (also published as 2012/0103365 on May 5, 2012).
Office Action mailed Jun. 11, 2012 in connection with U.S. Appl. No. 12/938,041 (6 pages).
Response filed Jul. 11, 2012 in connection with U.S. Appl. No. 12/938,041 (10 pages).
Office Action mailed Aug. 28, 2012 in connection with U.S. Appl. No. 12/938,041 (11 pages).
Response filed Feb. 28, 2013 in connection with U.S. Appl. No. 12/938,041 (15 pages).
Office Action mailed Oct. 11, 2011 issued in connection with U.S. Appl. No. 29/378,304 (5 pages).
Response filed Jan. 31, 2012 in connection with U.S. Appl. No. 29/378,304 (10 pages).
Notice of Allowance dated Feb. 15, 2012 issued in connection with U.S. Appl. No. 29/378,304 (4 pages).
Notice of Abandonment mailed May 31, 2012 from U.S. Appl. No. 29/378,304 (1 page).
YouTube Video of Mopper Cleaner, http://www.youtube.com/watch?v=d8NAUWHOQCk&feature=BFa&list=ULopafx7W4Po, e.g., attached screen shots (45 pages).
U.S. Appl. No. 29/324,616, entitled: "Pool Cleaner," filed on Sep. 16, 2008 (9 pages), issued Aug. 11, 2009 as U.S. Patent D598168.
Translation of previously-cited FR2693499 (13 pages) Exact Date Unknown.
Notice of Allowance mailed May 4, 2009 issued in connection with U.S. Appl. No. 29/324,616, filed Sep. 16, 2008 (7 pages).
U.S. Appl. No. 12/211,720, entitled: Apparatus for Facilitating Maintenance of a Pool Cleaning Device filed on Sep. 16, 2008 (45 pages) issued Jan. 1, 2013 as U.S. Patent No. 8,343,339.
Restriction Requirement mailed Jul. 19, 2010 issued in connection with U.S. Appl. No. 12/211,720 (7 pages).
Response to Restriction Requirement filed Dec. 20, 2010 in connection with U.S. Appl. No. 12/211,720 (9 pages).
Office Action mailed Sep. 26, 2011 issued in connection with U.S. Appl. No. 12/211,720 (7 pages).
Response filed Dec. 27, 2011 in connection with U.S. Appl. No. 12/211,720 (9 pages).
Amendment filed Aug. 10, 2012 together with a Request for Continued Examination in connection with U.S. Appl. No. 12/211,720 (12 pages).
Notice of Allowance dated Aug. 27, 2012 issued in connection with U.S. Appl. No. 12/211,720 (8 pages).
U.S. Appl. No. 13/213,514, entitled: Apparatus for Facilitating Maintenance of a Pool Cleaning Device filed on Aug. 19, 2011 (48 pages).
Office Action mailed Dec. 28, 2011 issued in connection with U.S. Appl. No. 13/213,514 (8 pages).
Response filed Jun. 28, 2012 in connection with U.S. Appl. No. 13/213,514 (20 pages).
Notice of Allowance dated Jul. 6, 2012 issued in connection with U.S. Appl. No. 13/213,514 including Statement of Reasons for Allowance (7 pages).
Office Action mailed Apr. 26, 2013 issued in connection with U.S. Appl. No. 12/938,041 (8 pages).
Notice of Allowance dated May 10, 2012 issued in connection with U.S. Appl. No. 12/211,720 (7 pages).
Notice of Allowance dated Feb. 2, 2012 from U.S. Appl. No. 12/211,720 (7 pages).
Office Action mailed Nov. 13, 2013 issued in connection with European Patent Application Serial No. 05753885.2 (11 pages).
Office Action mailed Mar. 12, 2013 issued in connection with U.S. Appl. No. 13/722,112 (11 pages).

(56) References Cited

OTHER PUBLICATIONS

Notice of Abandonment mailed Sep. 26, 2013 issued in connection with U.S. Appl. No. 13/722,112 (2 pages).
Response filed Oct. 1, 2013 in connection with U.S. Appl. No. 12/938,041 (14 pages).
Notice of Allowance mailed Oct. 15, 2013 in connection with U.S. Appl. No. 12/938,041 (7 pages).
Amendment and Reply to Notice of Allowance filed Jan. 14, 2014 in connection with U.S. Appl. No. 12/038,041 (13 pages).
Office Action mailed Nov. 7, 2013 issued in connection with U.S. Appl. No. 13/601,436 (33 pages).
Office Action mailed Feb. 19, 2014, from U.S. Appl. No. 12/938,041 (11 pages).

* cited by examiner

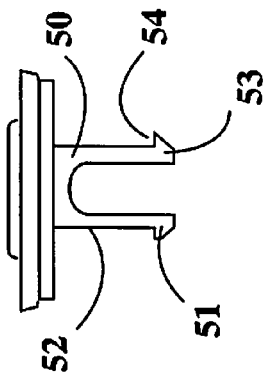
FIG. 29
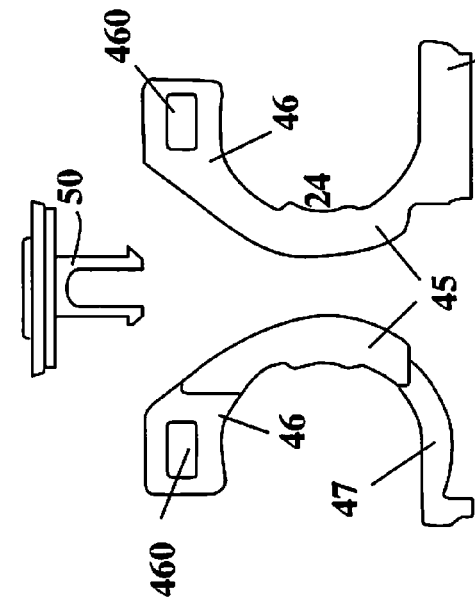
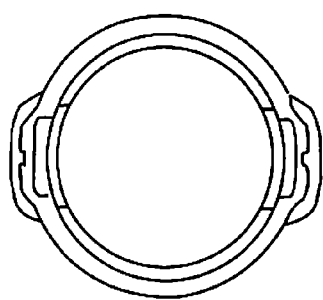
FIG. 28
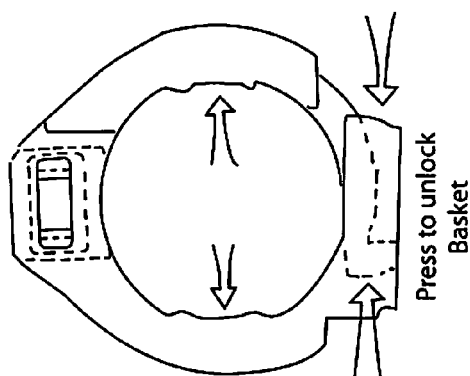
FIG. 31
FIG. 27
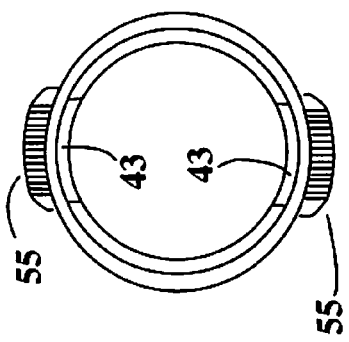
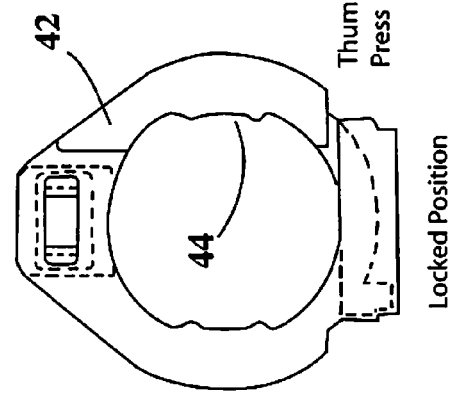
FIG. 30

SWIMMING POOL CLEANER WITH A RIGID DEBRIS CANISTER

FIELD OF THE INVENTION

The present invention relates to swimming pool cleaners and, more particularly, to automatic swimming pool cleaners movable along an underwater pool surface for purposes of cleaning debris therefrom. Still more particularly, this invention relates to debris-collection means for swimming pool cleaners having the flow of water pumped and/or sucked by remote pumps into and through the pool cleaners.

BACKGROUND OF THE INVENTION

Automatic swimming pool cleaners of the type that move about the underwater surfaces of a swimming pool are driven by many different kinds of systems. A variety of different pool-cleaner devices in one way or another harness the flow of water, as it is drawn or pushed through the pool cleaner by the pumping action of a remote pump for debris collection purposes.

Suction automatic pool cleaners are very successful when there is fine debris or debris that become soft in water. This fine debris is sucked up by the cleaner and deposited into a pump basket, or other debris-collection device, and the really fine debris passes into the pool filter. An example of a suction cleaner is disclosed in commonly-owned U.S. Pat. No. 6,854,148 (Rief et al.), entire contents of which are incorporated herein by reference.

Suction automatic swimming pool cleaners are used in places with much sand and slit. Although suction cleaners can take leafy debris once it has softened in the pool, large debris such as large acorns and hard leafs would plug up a suction cleaner. Suction swimming pool cleaners are also limited to the debris size due to loss of suction if the inlet and/or outlet orifices are widened to accommodate such large debris and of the possibility of large debris clogging the pool pipes.

Conversely, pressure automatic swimming pool cleaners are very successful when there is large debris such as leaves and acorns, these large debris are pulled off the pool surface by virtue of a venturi effect and are placed into a debris-collection device, such as a bag, above the cleaner. An example of a pressure cleaner is disclosed in commonly-owned U.S. Pat. No. 6,782,578 (Rief et al.), entire contents of which are incorporated herein by reference.

With a pressure swimming pool cleaner, the limitation is the opposite to the suction cleaner. In removing very large debris from the swimming pool, a pressure cleaner uses a collection bag. Regardless of how fine the bag is, sand and slit can pass through the bag back into the pool.

The problem is that most often only one cleaner is used in a pool. Therefore, people have either a suction cleaner or a pressure cleaner. Many swimming-pool builders place a suction cleaner into a pool when it is built. This is because there is no real landscaping around the pool at the time of the cleaner installation. However, just few years later, when trees and bushes have grown up, the debris becomes overwhelming and constantly plugs the suction cleaner.

Still with the pressure cleaner, no matter how large debris is in the pool, there is always sand and slit from cement and other elements of the surrounding environment. Such fine debris will pass through the debris-collection bag back into the pool. Although some swimming pool pressure cleaners have tails that supposedly whip the debris toward the main drain, in reality such tails only bring the dirt into suspension until it falls back on the pool bottom to start the process all over again.

Attempts have been made to utilize both a suction power and a pressure flow from remote pumps by the same swimming pool cleaner apparatus.

Another common flaw of pool cleaners is the debris collector which typically presents certain maintenance difficulties. More specifically, when the cleaner operates as a suction cleaner, the debris collector is typically connected to the hoses. This presents a hindrance to the movement of the cleaner and the hoses. Moreover, such in-line debris collectors are typically located in awkward positions in the pool and are difficult to clean.

It would have been highly beneficial to a suction-cleaner debris collector which is easy to install and maintain and which keeps the pump basket clear of debris.

Pressure cleaners are known to use flexible nylon bags typically made from a soft material. They also have a tendency to be caught under the cleaner wheels and be damaged. These bags have to be replaced frequently due to tearing and other damage caused by manhandling and improper installation of the bag, including chemical damage to the material of the bag.

Furthermore, while flexible bags may trap some fine debris, most of slit and dirt flows back into the pool. Flexible bags are hard to clean due to their collapsible nature. In order to clean the bag, one has to open up a zipper, hook-and-loop or slide-on-T closure. Most often dirt gets logged into these closures making it difficult to clean the closures and the bag.

In the pool, flexible bags act like sails and are a hindrance to pool-cleaner movement. When the bag is full of debris, the balance is lost and the bag falls over, may get caught under cleaner's wheels and obstructs free movement of the cleaner. Once the bag falls over, cleaning ability of the cleaner is lost, but the cleaner may still attempt to move thereby damaging the bag and making it increasingly difficult to clean or replace the damaged bag.

It is desirable to have a pressure-cleaner debris collector with an increased debris capacity, easy to install and to clean, which gives the cleaner improved buoyancy, and is durable and long lasting.

OBJECTS OF THE INVENTION

It is an object of the invention to provide an improved swimming pool cleaner overcoming some of the problems and shortcomings of the prior art, including those referred to above.

Another object of the invention is to provide an improved swimming pool cleaner which is able to successfully remove fine and large debris from the swimming-pool underwater surface.

Another object of the invention is to provide an improved single swimming pool cleaner which may operate as a suction cleaner or as a pressure cleaner.

Still another object of the present invention is to provide an improved swimming pool cleaner that is easily transformed from a pressure-cleaner type to a suction-cleaner type or from the suction-cleaner type to the pressure-cleaner type.

Yet another object of the present invention is to provide an improved swimming pool cleaner that includes a suction-cleaner debris collector which is easy to install and maintain.

Another object of the invention is to provide an improved suction swimming pool cleaner which keeps the pump basket clear of debris.

Another object of the present invention is to provide an improved swimming pool cleaner that includes a debris collector with an increased debris capacity yet gives the cleaner correct buoyancy.

Still another object of the present invention is to provide an improved swimming pool cleaner that includes a debris collector which is easy to install and to clean, and which is durable and long lasting.

How these and other objects are accomplished will become apparent from the following descriptions and the drawings.

SUMMARY OF THE INVENTION

This invention is an improved swimming pool cleaner of the type movable along an underwater pool surface to clean debris therefrom. The swimming pool cleaner includes a body having a debris inlet and a debris outlet.

The inventive swimming pool cleaner includes a rigid debris-collection canister secured to the cleaner body over the debris outlet to collect debris in the rigid canister and pass filtered water either back into the pool or to a remote suction system. In the inventive swimming pool cleaner the collected debris remain at the pool-cleaner body for easy maintenance while allowing free flow of water through the rigid canister. The rigid canister is shaped to minimize obstructions to the pool cleaner movement in the pool by providing improved buoyancy and limiting entrapment of the cleaner by underwater pool structures.

In some embodiments when the inventive pool cleaner operates as a suction cleaner, the rigid debris-collection canister has a substantially sealed interior to maintain suction. The canister preferably includes a fine-mesh container connected to the debris outlet and positioned for entrapping debris in the sealed interior. The rigid canister also has a connection to a suction-system hose for passing filtered water thereto. The connection to the suction-system hose is preferably a swivel connection allowing the pool cleaner turn in different directions without twisting the hose. The swivel connection may be of the type disclosed in commonly-owned U.S. Pat. No. 6,733,046 (Rief), entire contents of which are incorporated herein by reference. Any other known connection, of course, may also be used.

In the suction-cleaner embodiment, the rigid debris-collection canister preferably includes a base portion and a cover portion which is sealingly connected to the base portion. In some of such embodiments the rigid debris-collection canister includes an o-ring gasket seal between the base and cover portions. However, any other suitable seal may clearly be used to achieve the sealed interior for the suction-cleaner rigid debris-collection canister.

In embodiments where the pool cleaner operates as a pressure cleaner; the rigid debris-collection canister includes a base portion and a cover portion connected to the base portion. The cover portion preferably has a series of apertures for passing filtered water back into the pool. It is preferred that the base portion of the rigid canister has a solid structure to retain fine debris therein. The cover portion may include a fine mesh insert positioned opposite the debris outlet to entrap fine debris such as sand and pollen.

In preferred embodiments, the rigid canister has a debris-receiving region about the debris outlet and a debris-collecting region extending from the debris-receiving region to the rear of the pool cleaner. The rigid canister is preferably configured such that the debris flow to the rear and accumulate from the debris-collecting region toward the debris-receiving region to fill up the canister substantially uniformly and substantially free of interference with the pool-cleaner operation.

The base portion preferably includes an L-shaped protrusion extending from a base-portion edge. The cover portion preferably defines an aperture configured to receive the L-shaped protrusion therein, thereby forming a hinge connection between the base and cover portions. It is preferred that the hinge connection is positioned at a forward end of the canister. The canister also preferably includes a retaining latch at a rear end thereof for securely locking the base portion to the cover portion during the pool cleaner operation.

Preferred embodiments of the inventive pool cleaner further include an attachment mechanism securely locking the rigid canister to the pool cleaner body. The attachment mechanism preferably includes a connector mechanism and a locking mechanism. The connector mechanism is secured to the debris outlet and defines a pair of oppositely-positioned slots. The locking mechanism forms a pair of oppositely-positioned locking projections. The locking mechanism is configured to snap the projections into the corresponding slots of the connector mechanism for securely attaching the rigid canister to the pool cleaner body for operation and to withdraw the projections from the slots for detaching the rigid canister from the cleaner for emptying and pool cleaner maintenance.

The locking mechanism preferably includes a pair of locking members each including one of the locking projections. Each locking member has a fixed end which is secured to the rigid canister and a free end. In a released state, the locking members maintain the projections in the corresponding slots and when the free ends are pressed toward each other the projections are withdrawn from the slots thereby releasing the rigid canister from the cleaner body. Each of the locking members may include a finger grip at its free end for a simple finger pressing of the free ends toward each other to withdraw the projections from the slots to detach of the rigid canister from the pool-cleaner body.

Each fixed end of the locking member preferably defines a hole therethrough. A fastener stud extends through the holes of both fixed ends and a canister wall, thereby affixing the fixed ends to the rigid canister. The fastener stud may have a U-like shape and include a gripping wedge extending outwardly substantially perpendicular along each leg of the U-shaped stud and sloping to terminate at the end of the leg. The perpendicular surfaces of the wedges engage an interior surface of the rigid canister, thereby securely mounting the locking mechanism to the rigid canister.

The connector mechanism may include a pair of corresponding keys, one on each of first and second connector portions. The first connector portion preferably extends from the pool-cleaner body around the debris outlet. The second connector portion may be secured to the first connector portion by interengagement of the corresponding keys which engage by rotation of the first and second connector portions. The second connector portion preferably defines the pair of oppositely-positioned slots.

The swimming pool cleaner of the present invention provides an important advantage in that it can be interchangeably usable as a suction cleaner for removal of fine debris such as sand and slit and as a pressure cleaner for removal of large and hard debris such as large leaves, acorns and stones.

One such apparatus is disclosed in co-owned U.S. patent application Ser. No. 12/581,405 (Rief et al.) filed on Oct. 19, 2009, entire contents of which are incorporated herein by reference. This application discloses a single cleaner which is successful is removing both fine and large debris from the swimming-pool underwater surface.

The swimming pool cleaner of the '405 Rief et al. application can be interchangeably usable as a suction cleaner for removal of fine debris such as sand and slit and as a pressure cleaner for removal of large and hard debris such as large leaves, acorns and stones. The body of this cleaner is adapted at the debris outlet for securement of either a water-suction hose connected to a remote suction system or a debris-collection device entrapping debris and passing water therethrough back into the pool. When the cleaner is used as a pressure cleaner, a venturi-line structure is secured with respect to the body. The body is also adapted at the debris outlet for securement of a removable debris-outlet adjuster configured to reduce the debris outlet for connection to the water-suction hose and further includes a debris-inlet adjuster configured to reduce the debris inlet to adapt the cleaner for use as a suction cleaner.

In the inventive swimming pool cleaner, the cleaner body is adapted for securement of either a water-suction hose connected to a remote suction system or a venturi-line structure connected to a water-flow line fed by a remote pump such that the pool cleaner is interchangeably usable as a suction cleaner and as a pressure cleaner. A rigid debris-collection is canister secured to the cleaner body over the debris outlet to collect debris in the rigid canister and pass filtered water either back into the pool or to a remote suction system such that the collected debris remain at the pool-cleaner body for easy maintenance while allowing free flow of water through the rigid canister. The rigid canister is shaped to minimize obstructions to the pool cleaner movement in the pool by providing improved buoyancy and limiting entrapment of the cleaner by underwater pool structures such as ladders and the like.

BRIEF DESCRIPTION OF THE DRAWINGS

FIG. 27 is a top view of a first portion of the connector mechanism.

FIG. 28 is a top view of a second portion of the connector mechanism.

FIG. 29 is an exploded view of a locking mechanism with a fastener stud.

FIG. 30 is a top view of the locking mechanism in a locked position.

FIG. 31 is a top view of the locking mechanism in a unlocked position.

DETAILED DESCRIPTION OF PREFERRED EMBODIMENTS

Figure 1:
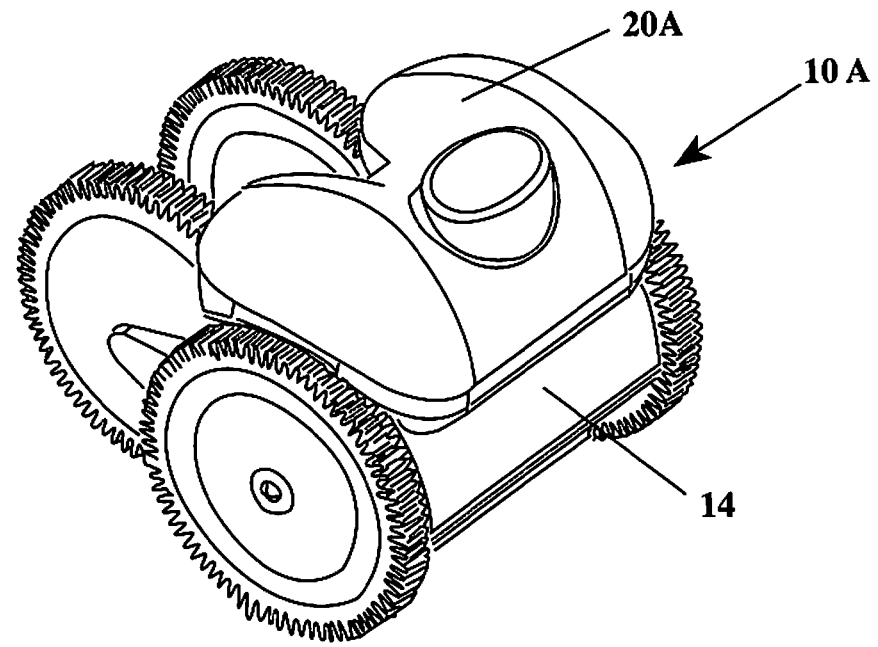
FIG. 1 is a front perspective view of an inventive swimming pool cleaner operating as a suction cleaner.

FIGS. 1-33 illustrate a preferred swimming pool cleaner 10 in accordance with the present invention. Swimming pool cleaner 10 is of the type movable along an underwater pool surface 11 to clean debris 12 therefrom. Swimming pool cleaner 10 includes a body 14 having a debris inlet 15 and a debris outlet 16. FIGS. 1-4 show preferred body 14 formed of two or more plastic pieces designed to accommodate the parts and features of the invention.

Figure 2:
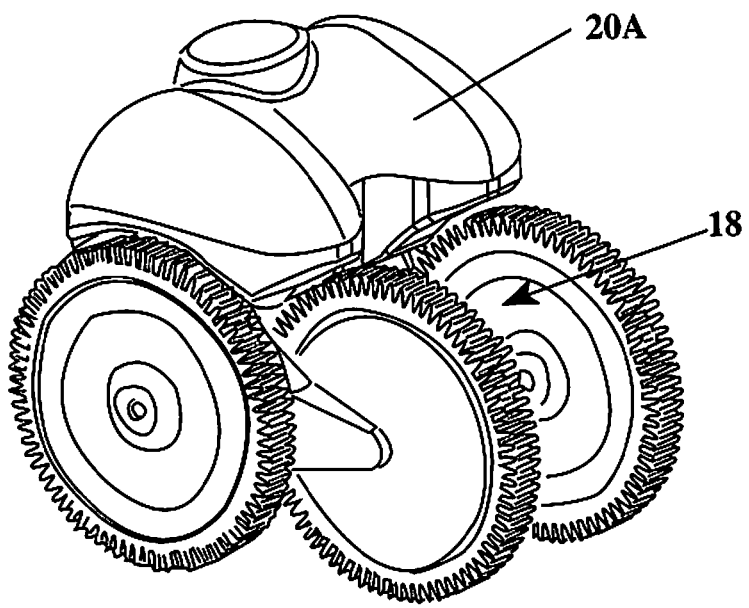
FIG. 2 is a rear perspective view of an inventive swimming pool cleaner of FIG. 1.
Figure 3:
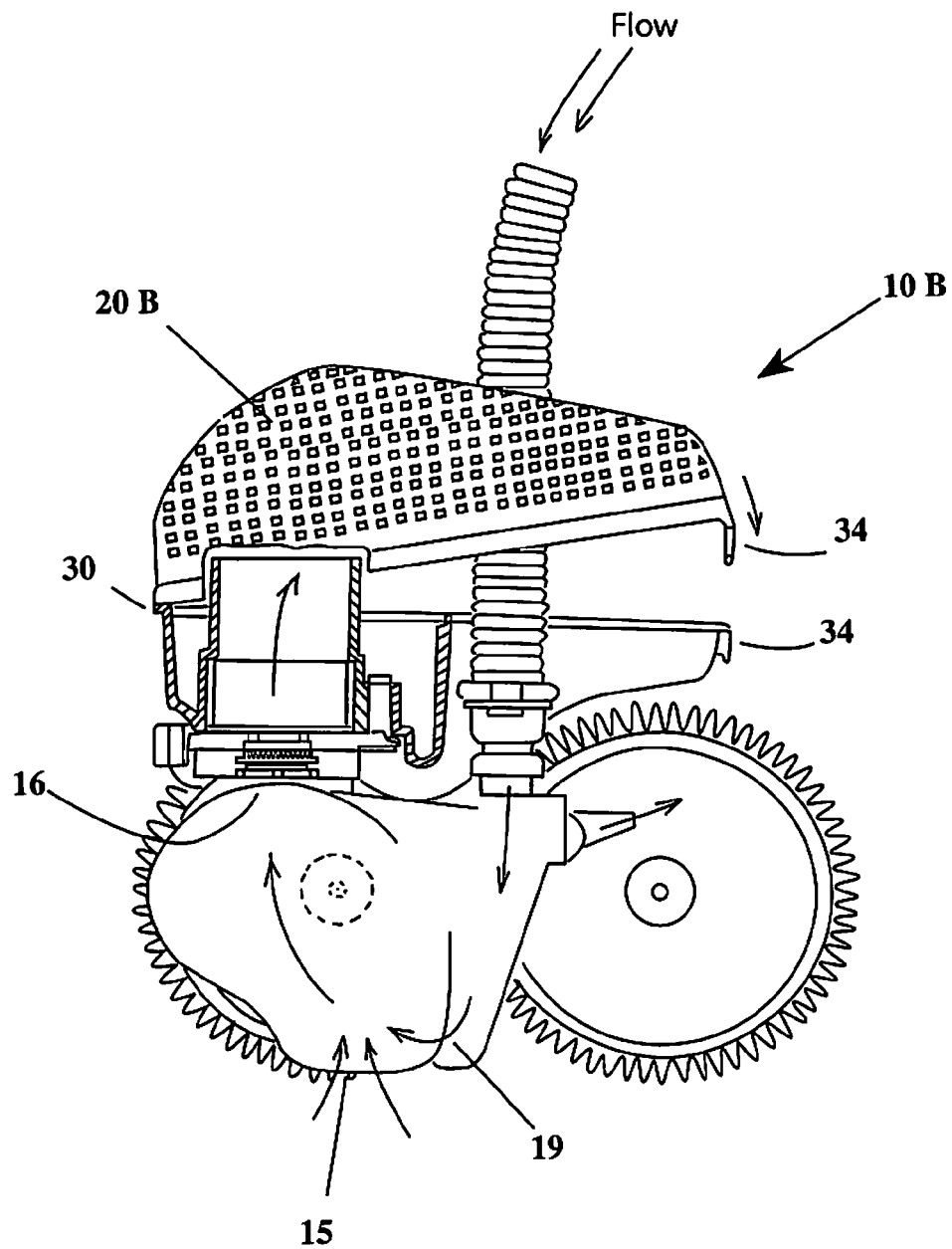
FIG. 3 is a side view of the inventive swimming pool cleaner operating as a pressure cleaner and showing a partial cross-section.
Figure 4:
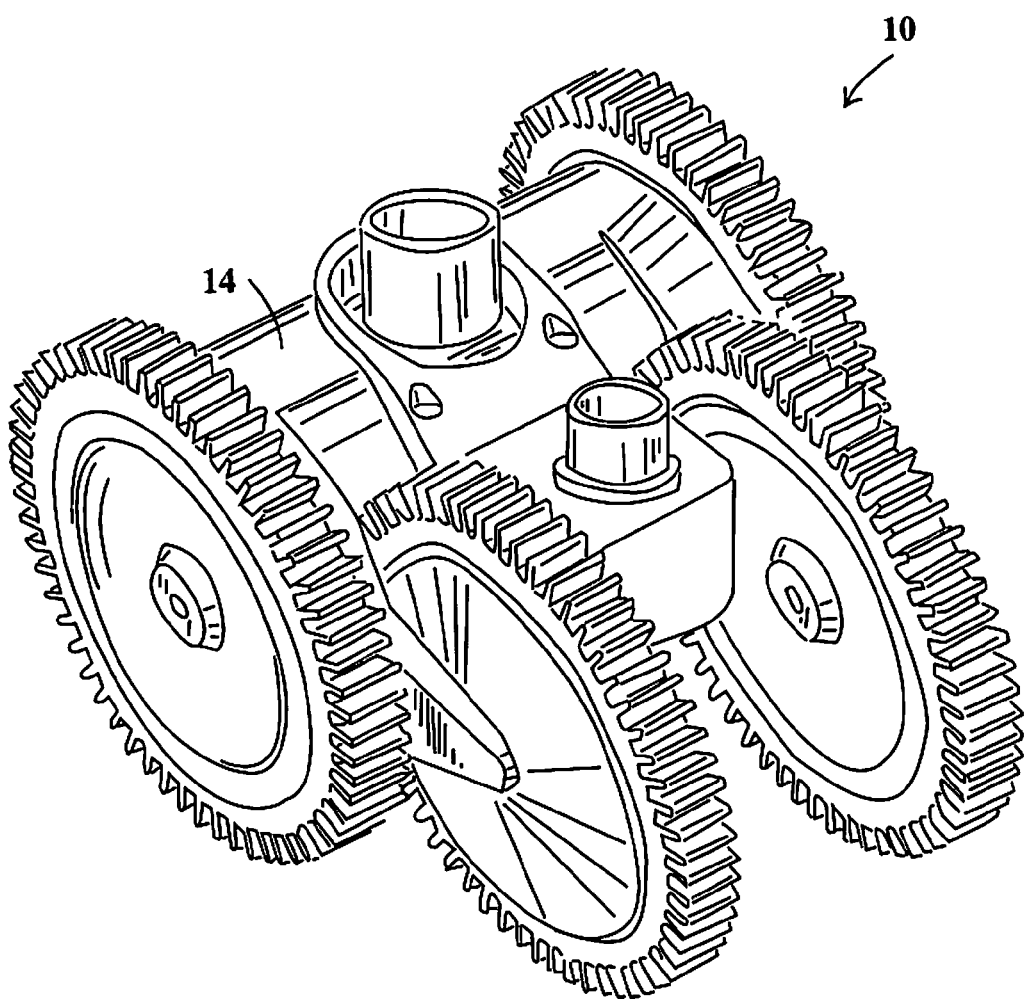
FIG. 4 is a perspective view of the inventive swimming pool cleaner without rigid canister.
Figure 5:
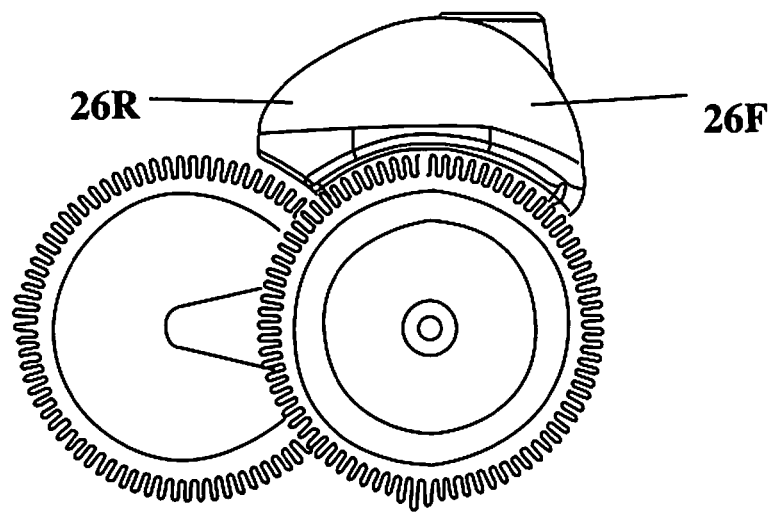
FIG. 5 is a side view of the inventive swimming pool cleaner of FIG. 1.
Figure 6:
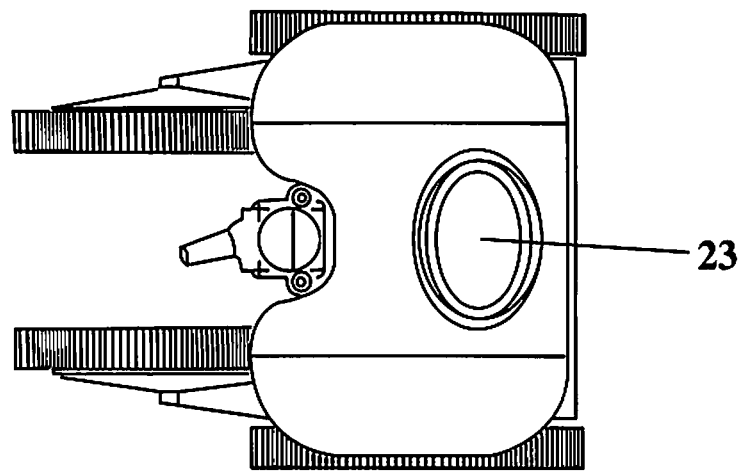
FIG. 6 is a top view of the inventive swimming pool cleaner of FIG. 1.
Figure 7:
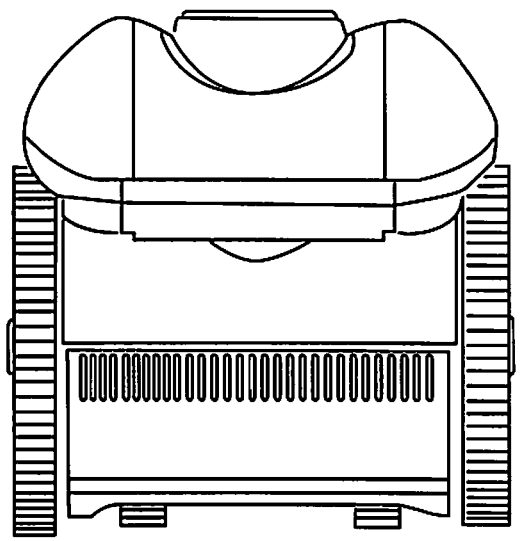
FIG. 7 is a front view of the inventive swimming pool cleaner of FIG. 1.
Figure 8:
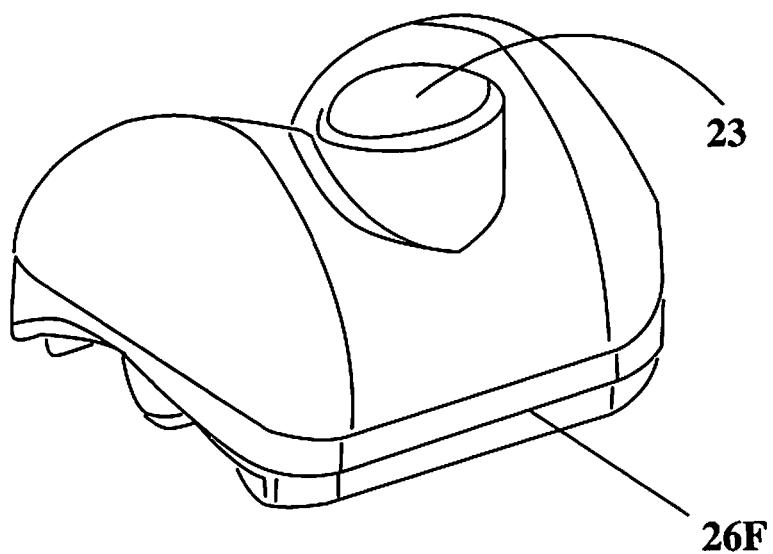
FIG. 8 is a perspective view of the rigid canister for a suction cleaner.
Figure 9:
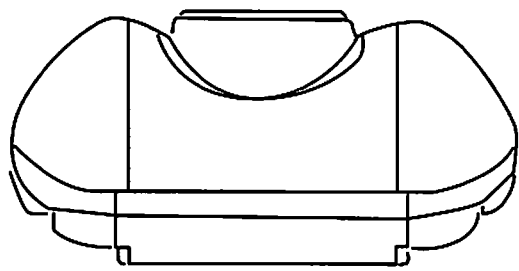
FIG. 9 is a front view of the rigid canister of FIG. 8.
Figure 10:
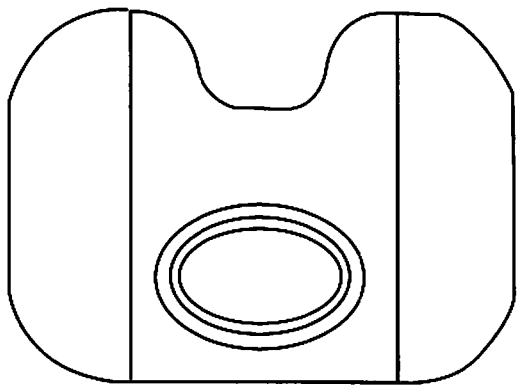
FIG. 10 is a top view of the rigid canister of FIG. 8.
Figure 11:
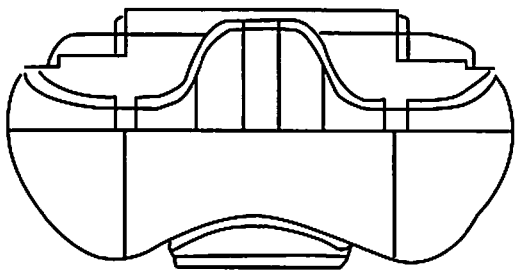
FIG. 11 is a rear view of the rigid canister of FIG. 8.
Figure 12:
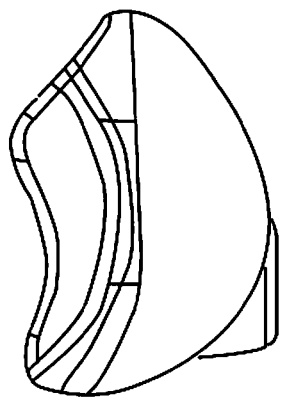
FIG. 12 is a side view of the rigid canister of FIG. 8.

As best seen in FIGS. 1-3, swimming pool cleaner 10 includes a rigid debris-collection canister 20 secured to cleaner body 14 over debris outlet 16 to collect debris 12 in rigid canister 20 and pass filtered water 17 either back into the pool or to a remote suction system. In swimming pool cleaner 10, collected debris 12 remain at pool-cleaner body 14 for easy maintenance while allowing free flow of water through rigid canister 20. FIGS. 1-3 and 5-12 best illustrate that rigid canister 20 is shaped to minimize obstructions to movement of pool cleaner movement in the pool by providing improved buoyancy and limiting entrapment of the cleaner by underwater pool structures. Canister has a smooth curved shape with rounded corners.

Figure 13:
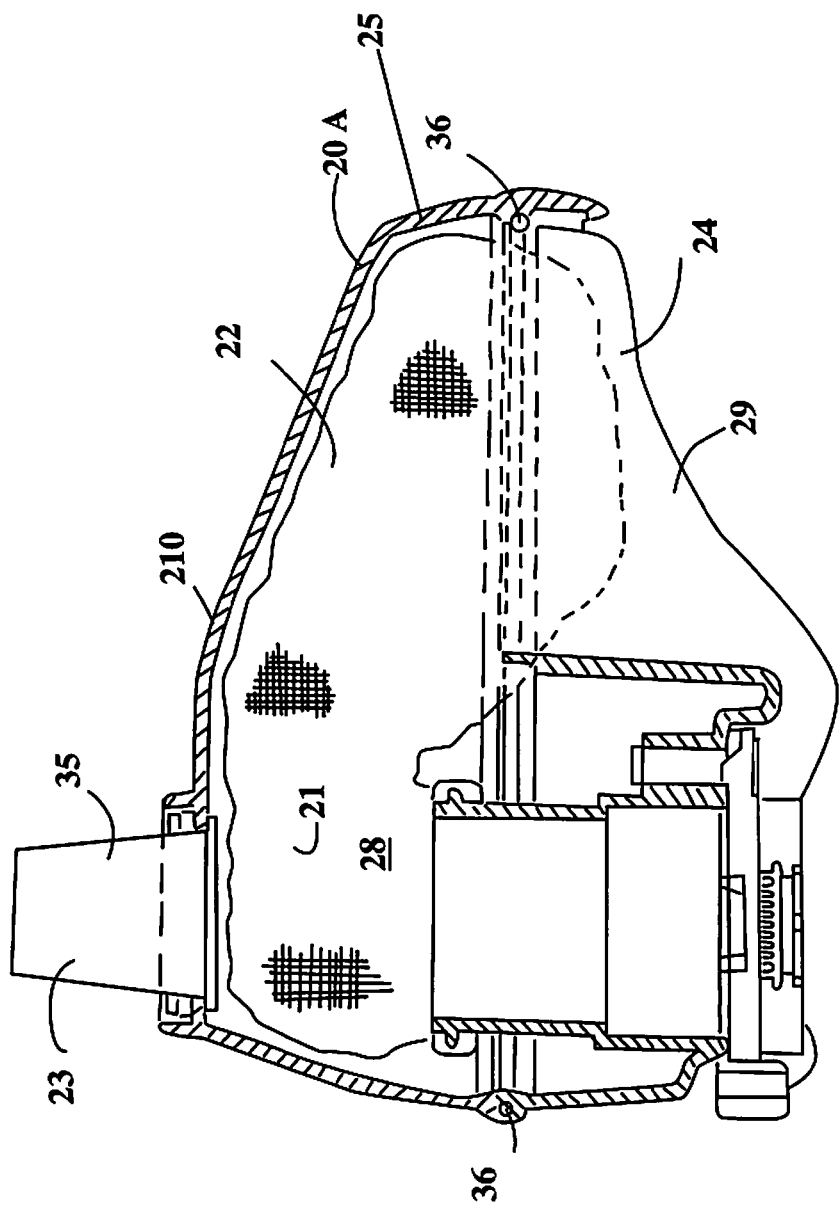
FIG. 13 is a cross-sectional side view of the rigid canister when attached to a suction mode.
Figure 14:
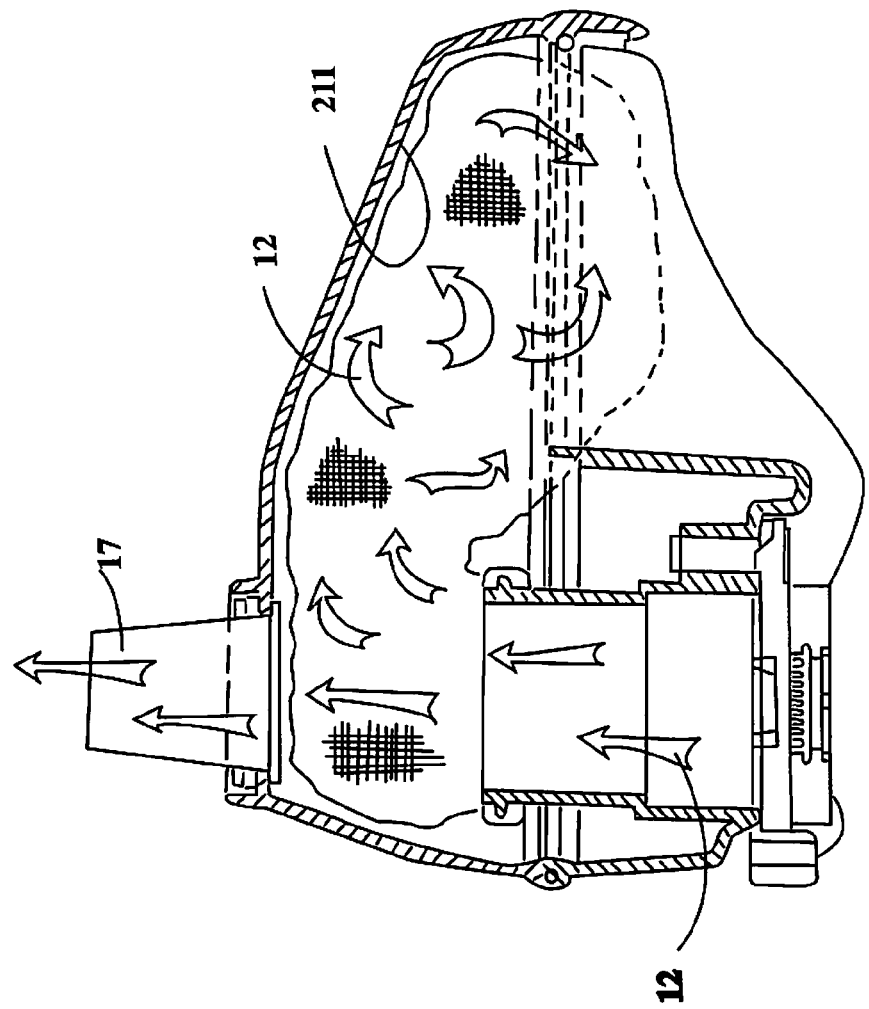
FIG. 14 is another cross-sectional side view of the rigid canister when attached to a suction-mode cleaner and showing flow of debris-filled water and filtered water.
Figure 15:
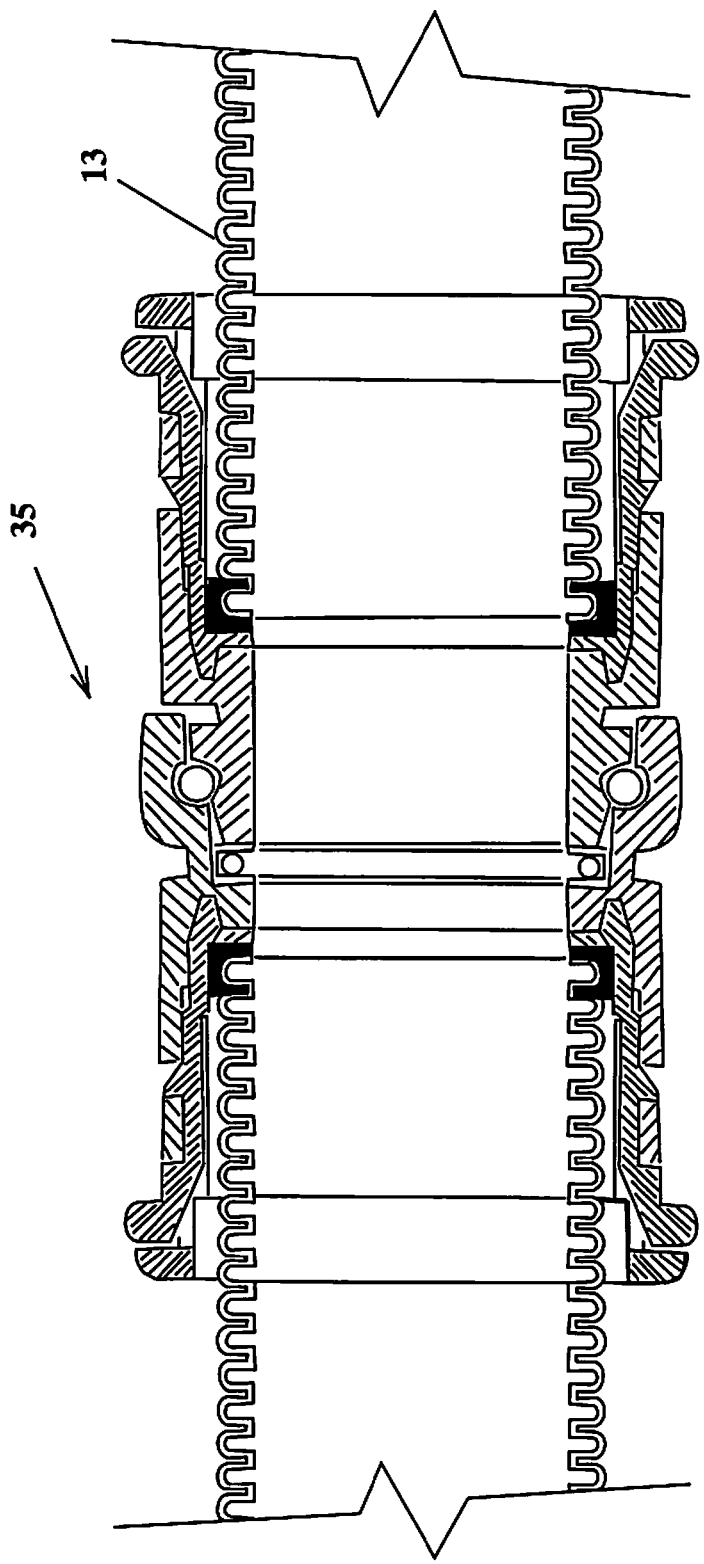
FIG. 15 is a cross-sectional view of a hose swivel connection.

FIGS. 13 and 14 show rigid canister 20A secured to pool cleaner 10A which operates as a suction cleaner 10A. Rigid debris-collection canister 20A has a substantially sealed interior 21 to maintain suction. Canister 20A includes a fine-mesh container 22 connected to debris outlet 16 and positioned for entrapping debris 12 in sealed interior 21. Rigid canister 20A also has a connection 23 to a suction-system hose 13 for passing filtered water 17 thereto. FIG. 15 shows connection 23 to suction-system hose 13 which is a swivel connection 35 allowing pool cleaner 10A to turn in different directions without twisting hose 13.

Rigid debris-collection canister 20 includes a base portion 24 and a cover portion 25. In canister 20A, cover portion 24 is sealingly connected to base portion 25. FIGS. 13 and 14 illustrate that rigid debris-collection canister 20A includes an o-ring gasket seal 36 between base portion 24 and cover portion 25.

Figure 16:
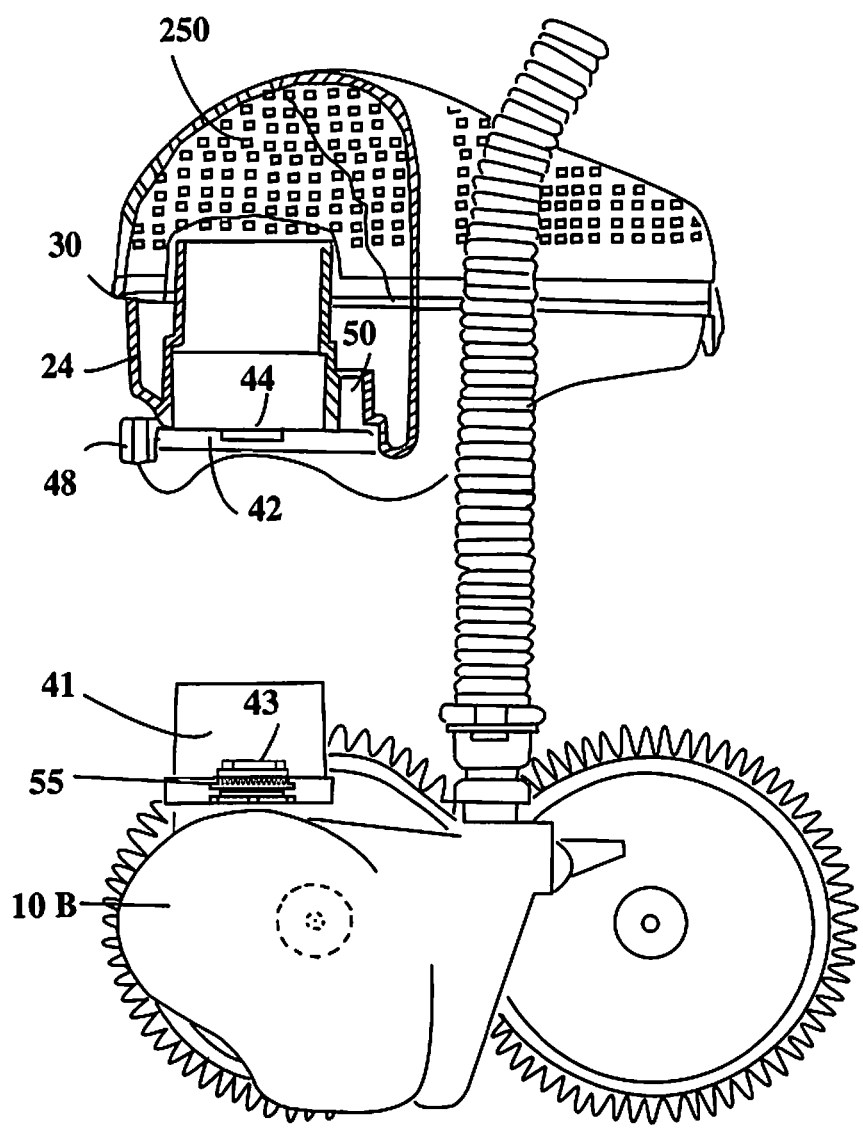
FIG. 16 is an exploded side view of the swimming pool cleaner in a pressure mode with a cross-sectional side view of the rigid canister for the pressure cleaner.
Figure 17:
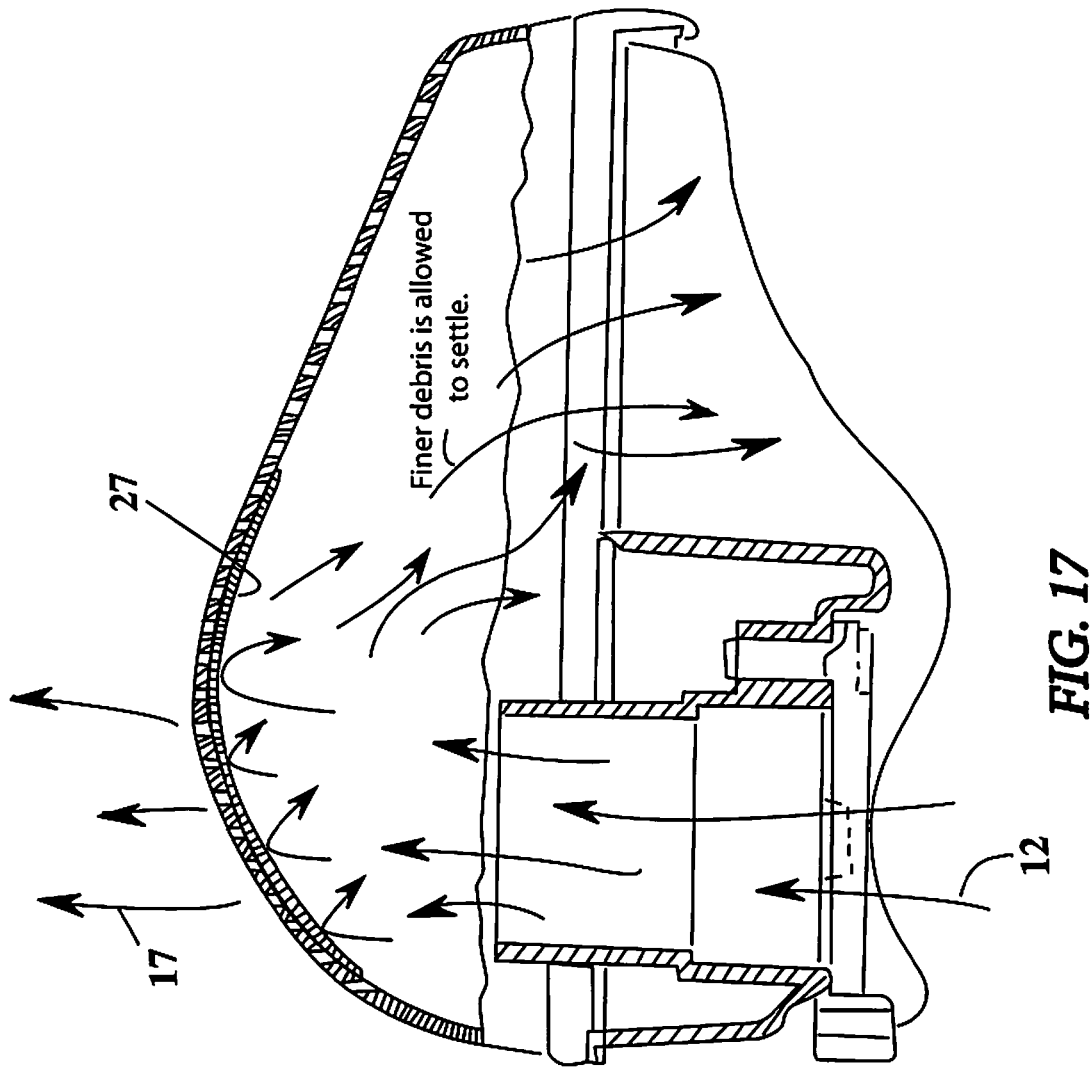
FIG. 17 is a cross-sectional side view of the rigid canister when attached to a pressure-mode cleaner and showing flow of debris-filled water and filtered water.
Figure 18:
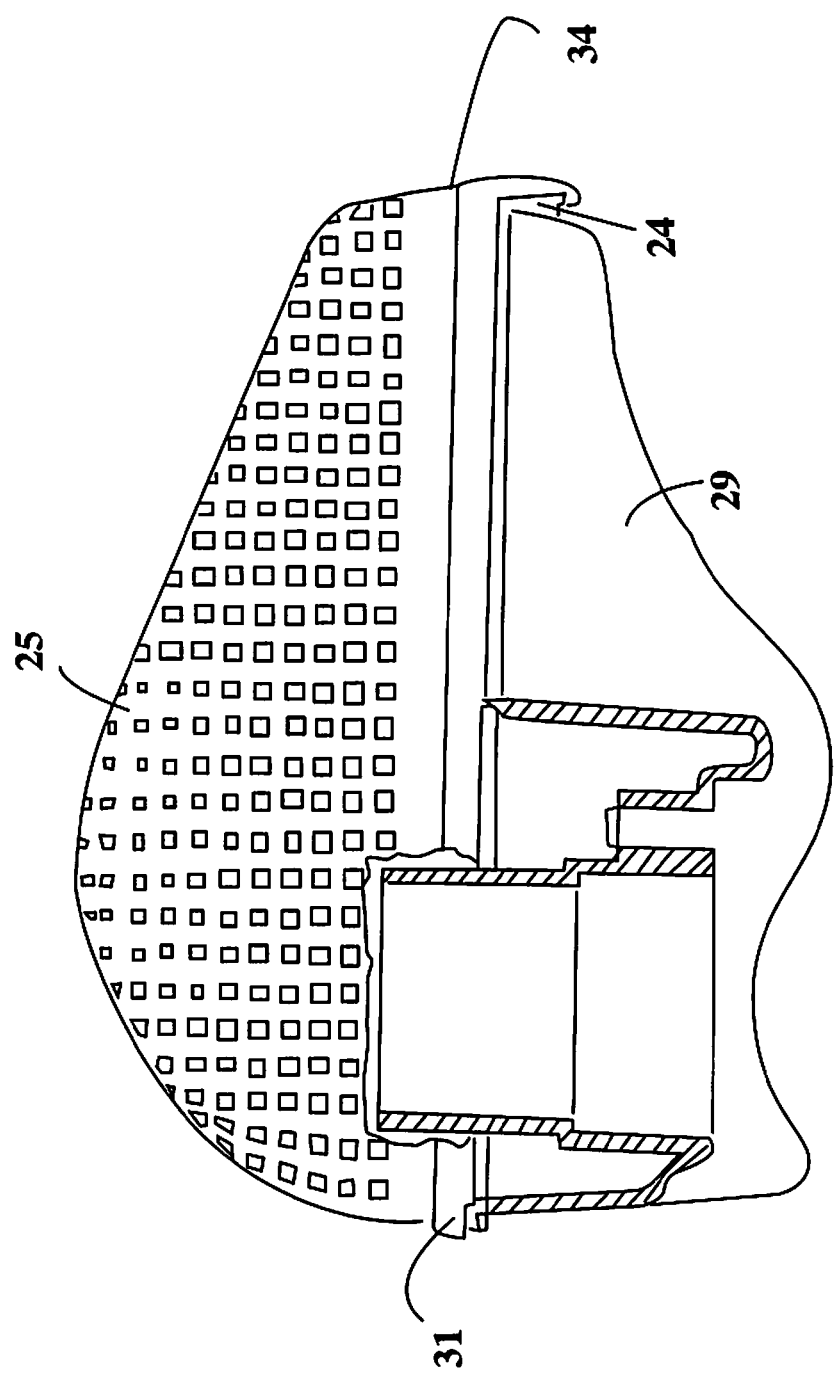
FIG. 18 is another cross-sectional side view of the rigid canister when attached to a pressure-mode cleaner.
Figure 19:
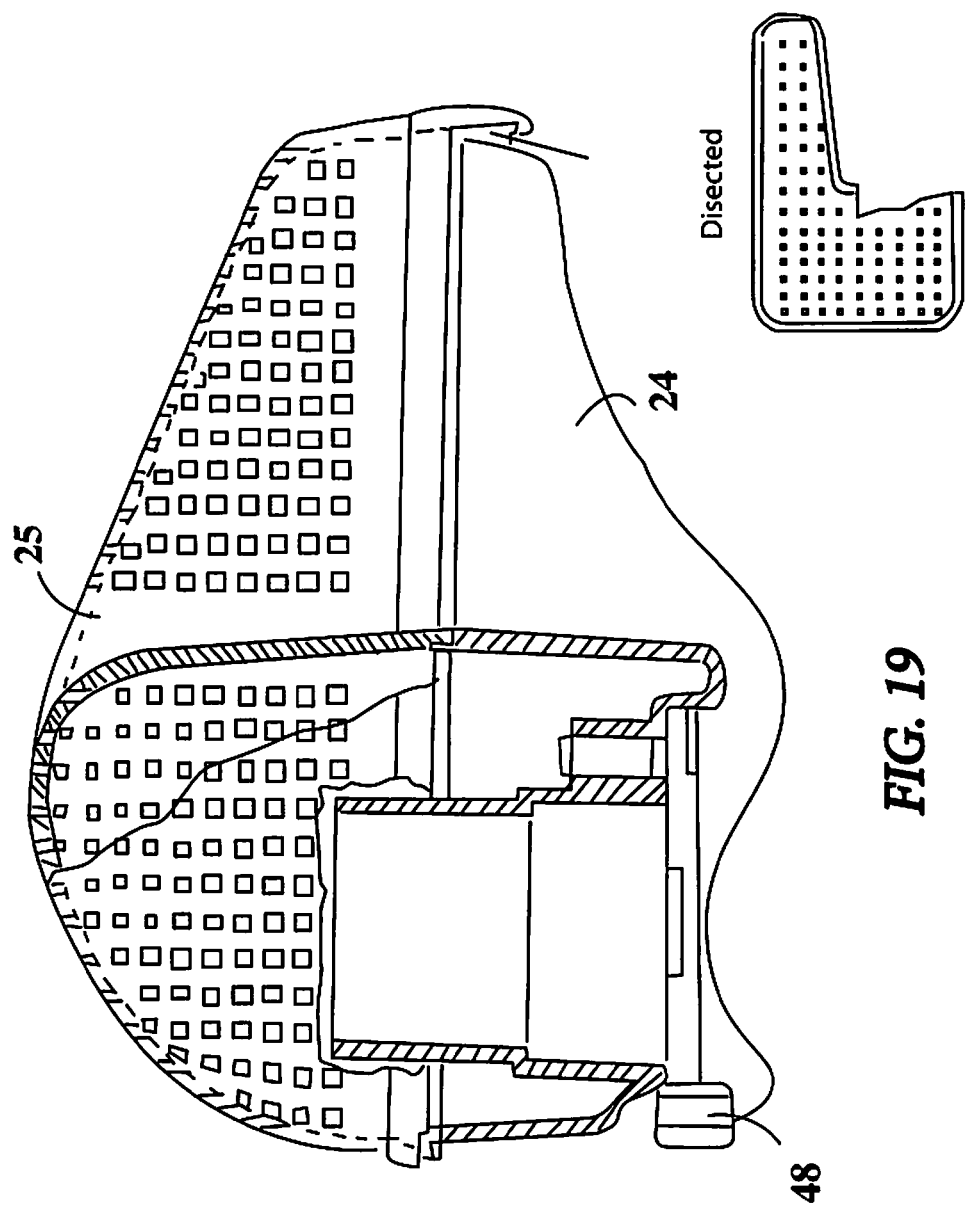
FIG. 19 is yet another cross-sectional side view of the rigid canister when attached to a pressure-mode cleaner.

FIGS. 16-22 illustrate embodiments where pool cleaner 10 operates as a pressure cleaner which includes rigid debris-collection canister 20B with base portion 24 and a cover portion 25B connected to base portion 24. As seen in FIGS. 3 and 16-22, cover portion 25B has a series of apertures 250 for passing filtered water 17 back into the pool. It is seen in FIGS. 16-19 and 22-24 that base portion 24 has a solid structure to retain fine debris therein. As illustrated in FIG. 17, cover portion 25B includes a fine mesh insert 27 positioned inside rigid canister 20B opposite debris outlet 16 to entrap fine debris such as sand and pollen.

As best seen in FIGS. 14 and 17, rigid canister 20 has a debris-receiving region 28 about debris outlet 16 and a debris-collecting region 29 extending from debris-receiving region 28 to rear 18 of pool cleaner 10. These FIGURES further illustrate that rigid canister 20 is configured such that debris 12 flow to rear 18 and accumulate from debris-collecting region 29 toward debris-receiving region 28 to fill up canister 20 substantially uniformly and substantially free of interference with the pool-cleaner operation.

Figure 20:
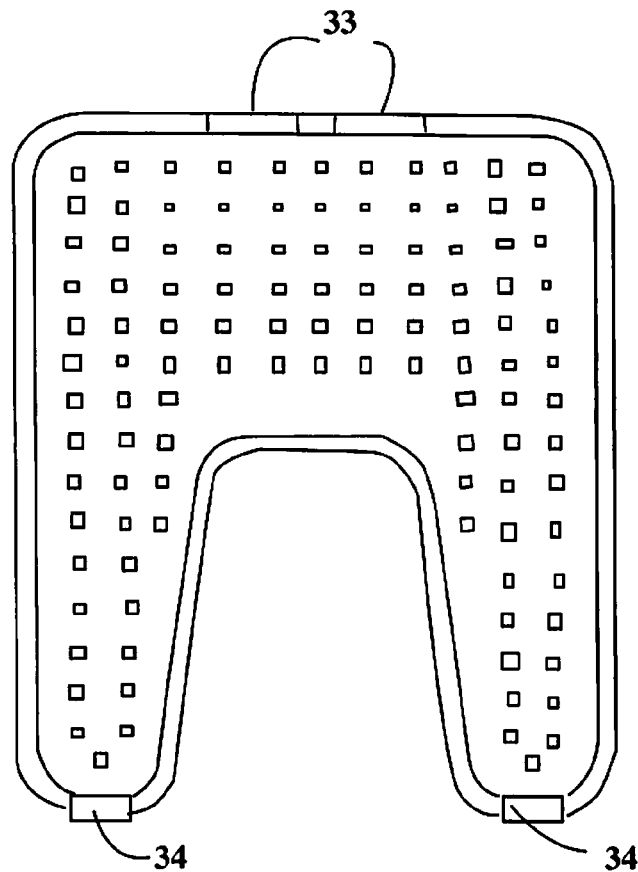
FIG. 20 is a top view of the rigid canister FIG. 19.
Figure 21:
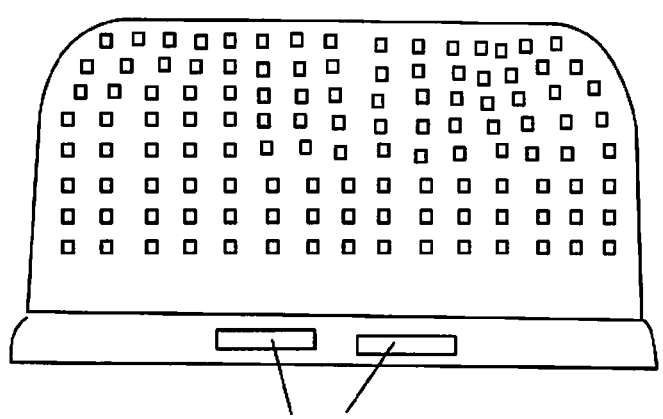
FIG. 21 is a front view of the rigid canister FIG. 19.
Figure 22:
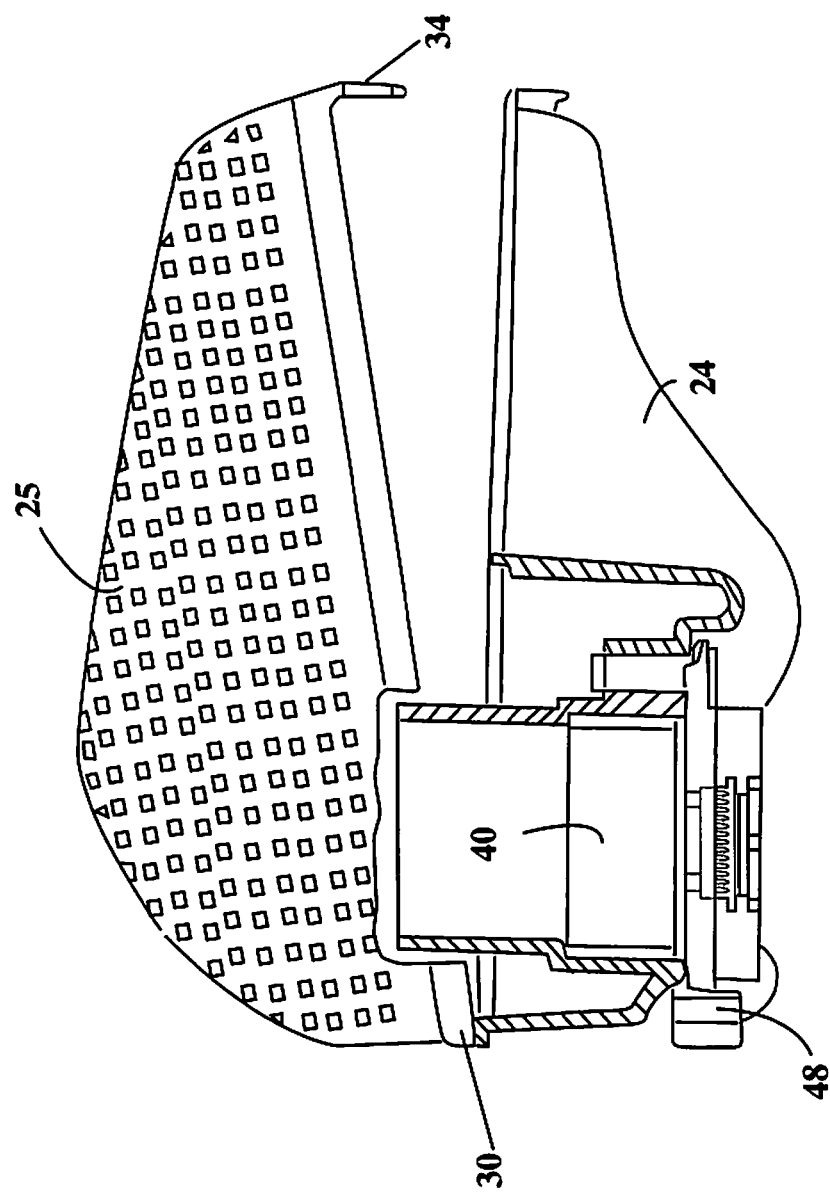
FIG. 22 is a cross-sectional side view of the rigid canister when attached to a pressure-mode cleaner and showing the hinge connection between the base and cover portions.
Figure 23:
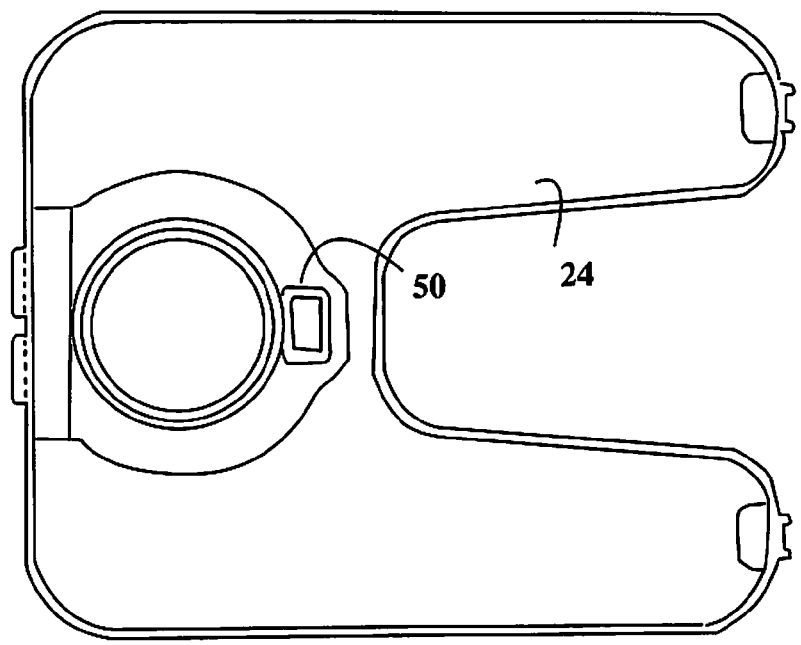
FIG. 23 is a top view of the base portion of the rigid canister.
Figure 24:
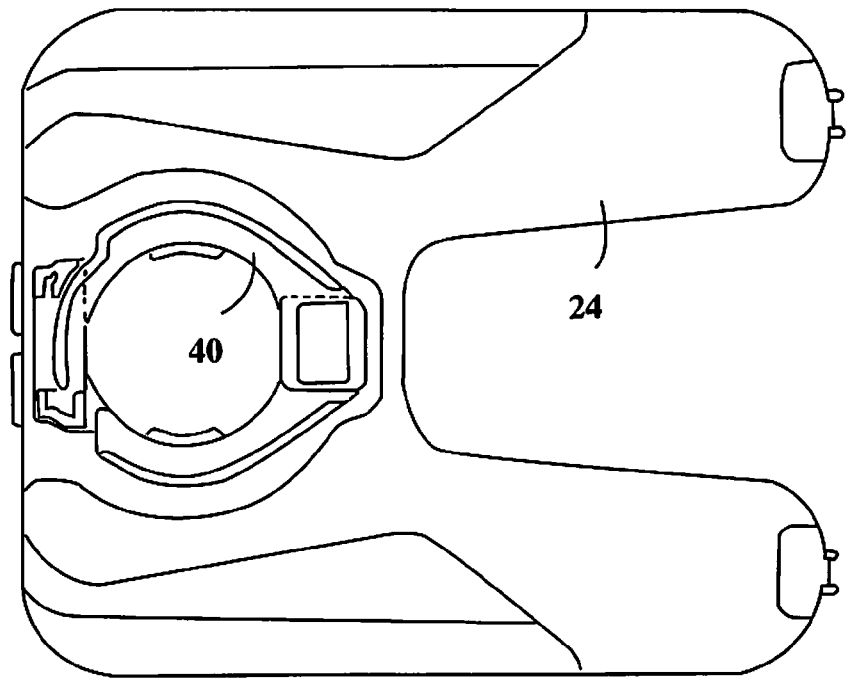
FIG. 24 is a top view of the base portion of the rigid canister with the attachment mechanism in place.

Base portion 24 includes L-shaped protrusions 31 extending from a base-portion edge 32, as seen in FIGS. 3, 16, 18 and 19. FIGS. 3, 20 and 21 best show that cover portion 25 defines apertures 33 configured to receive L-shaped protrusions 31 therein, thereby forming a hinge connection 30 between base portion 24 and cover portion 25. As illustrated at least in FIGS. 3 and 22, hinge connection 30 is positioned at a forward end 26F of canister 20. Canister 20 also includes a retaining latch 34 at a rear end 26R thereof for securely locking base portion 24 to cover portion 25 during the pool cleaner operation.

Figure 25:
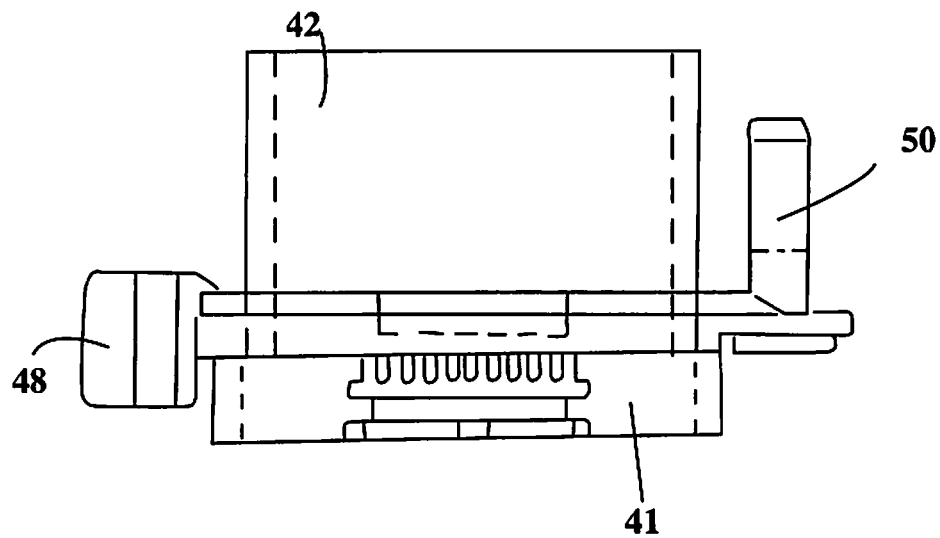
FIG. 25 is a side view of the attachment mechanism.
Figure 26:
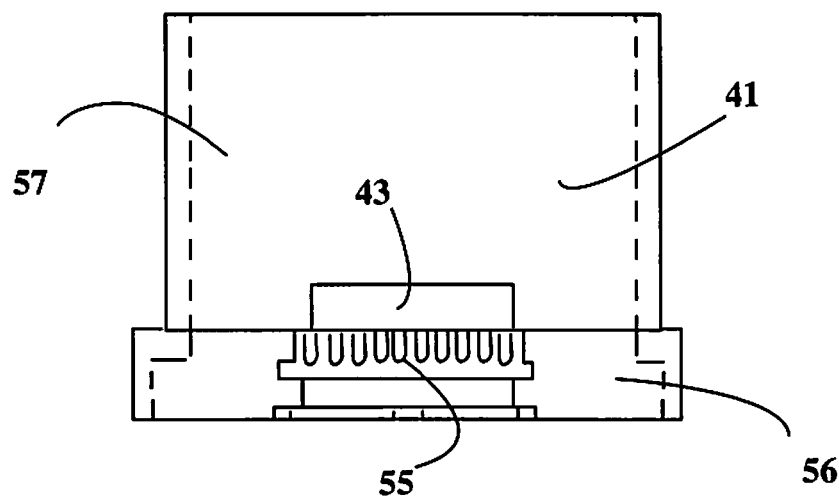
FIG. 26 is a side view of the connector mechanism.

Pool cleaner 10 further includes an attachment mechanism 40 securely locking rigid canister 20 to pool-cleaner body 14. Attachment mechanism 40, as shown in FIGS. 13, 16, 23-31, includes a connector mechanism 41 and a locking mechanism 42. Connector mechanism 41 is secured to debris outlet 16 and defines a pair of oppositely-positioned slots 43 best seen in FIGS. 26-28. Locking mechanism 42 forms a pair of oppositely-positioned locking projections 44. FIGS. 25, 30 and 31 illustrate that locking mechanism 42 is configured to snap projections 44 into corresponding slots 43 of connector mechanism 41 for securely attaching rigid canister 20 to pool cleaner body 14 for operation and to withdraw projections 44 from slots 43 for detaching rigid canister 20 from cleaner 10 for emptying and pool cleaner maintenance.

As best seen in FIGS. 29-31, locking mechanism 42 includes a pair of locking members 45 each including one of locking projections 44. Each locking member 45 has a fixed end 46 which is secured to rigid canister 20 and a free end 47. FIG. 30 shows locking mechanism in released state in which locking members 45 maintain projections 44 in corresponding slots 42. When free ends 47 are pressed toward each other, as seen in FIG. 31, projections 44 are withdrawn from slots 43 thereby releasing rigid canister 20 from cleaner body 14.

FIGS. 29-31 further show that each locking member 45 includes a finger grip 45 at its free end 47 for a simple finger pressing of free ends 47 toward each other to withdraw projections 44 from slots 43 to detach of rigid canister 20 from pool-cleaner body 14.

It is also seen in FIGS. 29-31 that each fixed end 46 of locking member 45 defines a hole 460 therethrough. A fastener stud 50 extends through holes 460 of both fixed ends 46 and a canister wall 210, thereby affixing fixed ends 46 to rigid canister 20. FIG. 29 shows that fastener stud 50 has a U-like shape and includes a gripping wedge 51 extending outwardly substantially perpendicular along each leg 52 of U-shaped stud 50 and sloping to terminate at the end 53 of leg 52. Perpendicular surfaces 54 of wedges 51 engage an interior surface 211 of rigid canister 20, thereby securely mounting locking mechanism 42 to rigid canister 20.

FIGS. 16 and 26-28 show that connector mechanism 41 includes a pair of corresponding keys 55, one on each of first connector portion 56 and second connector portion 57. As seen in FIG. 16, first connector portion 56 extends from pool-cleaner body 14 around debris outlet 16. Second connector portion 57 is secured to first connector portion 56 by interengagement of corresponding keys 55 which engage each other by rotation of first and second connector portions 56 and 57. Second connector portion 57 defines pair of oppositely-positioned slots 43.

Figure 32:
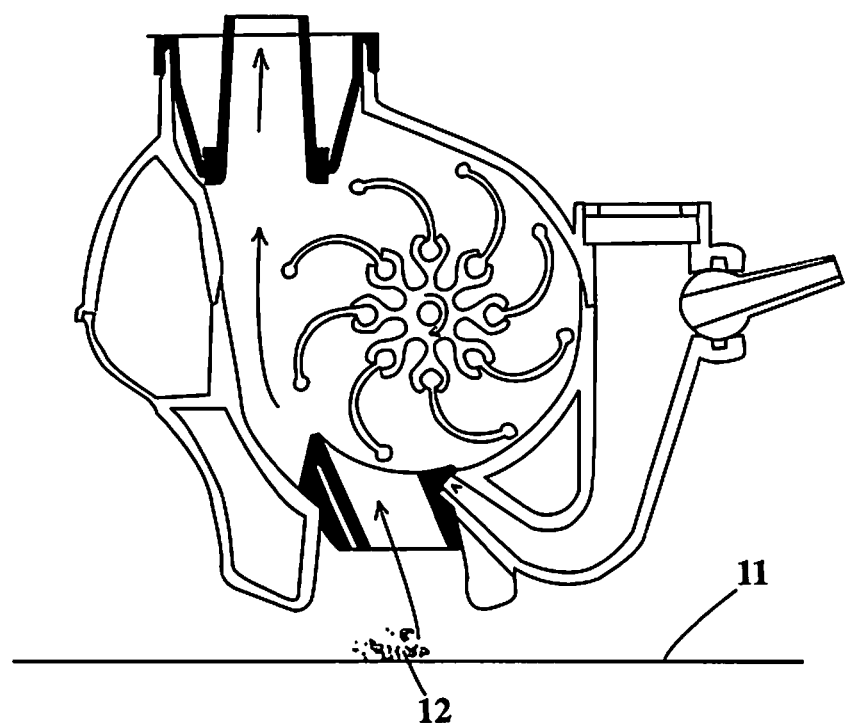
FIG. 32 is a fragmental side cross-sectional view of the pool cleaner in a suction mode.
Figure 33:
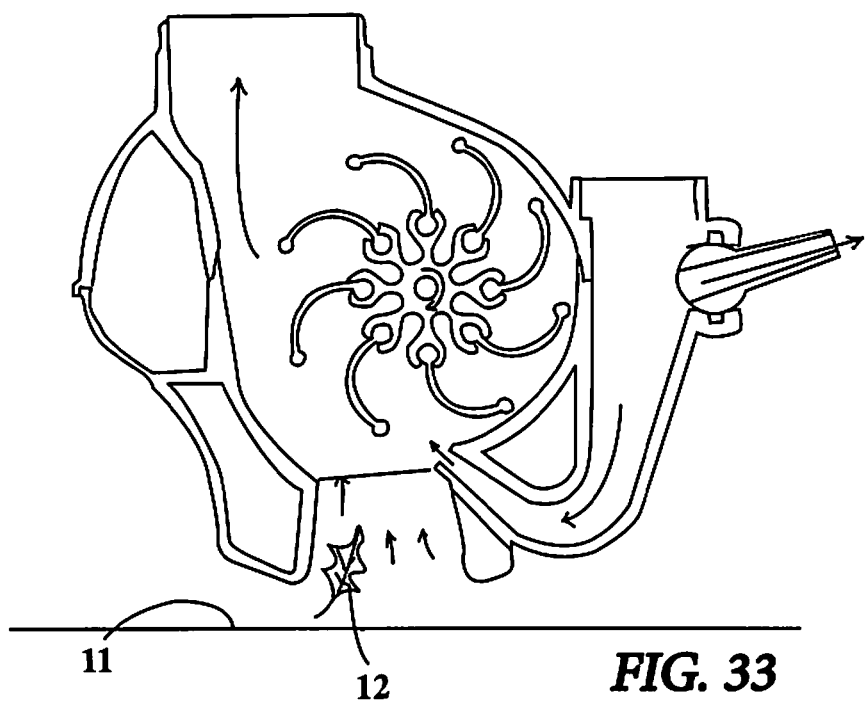
FIG. 33 is a fragmental side cross-sectional view of the pool cleaner in a pressure mode.

FIGS. 32 AND 33 illustrate that swimming pool cleaner 10 can be interchangeably usable as a suction cleaner 10A for removal of fine debris 12 such as sand and slit and as a pressure cleaner 10B for removal of large and hard debris 12 such as large leaves, acorns and stones.

It is seen in FIGS. 32 and 33 that cleaner body 14 is adapted for securement of either water-suction hose 13 connected to a remote suction system or a venturi-line structure 19 connected to a water-flow line fed by a remote pump such that the pool cleaner is interchangeably usable as suction cleaner 10A and as pressure cleaner 10B.

While the principles of the invention have been shown and described in connection with specific embodiments, it is to be understood that such embodiments are by way of example and are not limiting.

The invention claimed is:

1. In a swimming pool cleaner of the type movable along an underwater pool surface to clean debris therefrom, the pool cleaner being a suction cleaner and including a body having a debris inlet and a debris outlet, the improvement comprising a rigid debris-collection canister secured to the body over the debris outlet to collect debris in the rigid canister and pass filtered water to a remote suction system such that collected debris remains at the pool-cleaner body for easy maintenance while allowing free flow of water through the rigid canister, the rigid debris-collection canister having a substantially sealed interior to maintain suction, the canister further including (a) a fine-mesh container connected to the debris outlet and positioned for entrapping debris in the sealed interior, a connection to a suction-system hose for passing filtered water thereto.

2. The pool cleaner of claim 1 wherein the connection to the suction-system hose is a swivel connection allowing the pool cleaner turn in different directions without twisting the hose.

3. The pool cleaner of claim 1 wherein the rigid debris-collection canister includes a base portion and a cover portion sealingly connected to the base portion.

4. The pool cleaner of claim 3 wherein the rigid debris-collection canister includes an o-ring gasket seal between the base and cover portions.

5. In a swimming pool cleaner of the type movable along an underwater pool surface to clean debris therefrom, the pool cleaner being a pressure cleaner and comprising:
a body having a debris inlet and a debris outlet, the body including a venturi structure configured for drawing debris into the body through the debris inlet; and
a rigid debris-collection canister having (a) a base portion removably secured to the body over the debris outlet to collect debris in the rigid canister and (b) a cover portion movably connected to the base portion, the cover portion having a series of apertures for passing filtered water back into the pool such that collected debris remains at the pool-cleaner body for easy maintenance while allowing free flow of water through the rigid debris-collection canister.

6. The pool cleaner of claim 5 wherein the base portion of the rigid canister has a solid structure to retain fine debris therein.

7. The pool cleaner of claim 6 wherein the cover portion includes a fine mesh insert positioned opposite the debris outlet to entrap fine debris such as sand and pollen.

8. In a swimming pool cleaner of the type movable along an underwater pool surface to clean debris therefrom, the pool cleaner including a body having a debris inlet and a debris outlet, the improvement comprising:
   a rigid debris-collection canister secured to the body over the debris outlet to collect debris in the rigid canister and pass filtered water either back into the pool or to a remote suction system such that collected debris remains at the pool-cleaner body for easy maintenance while allowing free flow of water through the rigid canister, the rigid canister includes a base portion and a cover portion connected to the base portion, the base portion including an L-shaped protrusion extending from a base-portion edge, the cover portion defining an aperture configured to receive the L-shaped protrusion therein, thereby forming a hinge connection between the base and cover portions.

9. The pool cleaner of claim 8 wherein the rigid canister has a debris-receiving region about the debris outlet and a debris-collecting region extending from the debris-receiving region along the body of the pool cleaner, the rigid canister being configured such that debris flows from the debris-collecting region toward the debris-receiving region to fill up the canister substantially uniformly and substantially free of interference with pool-cleaner operation.

10. The pool cleaner of claim 9 wherein the hinge connection is positioned at an end of the canister which is opposite the debris-collecting region.

11. The pool cleaner of claim 10 wherein the canister includes a retaining latch for securely locking the base portion to the cover portion during the pool cleaner operation.

12. In a swimming pool cleaner of the type movable along an underwater pool surface to clean debris therefrom, the pool cleaner including a body having a debris inlet and a debris outlet, the improvement comprising:
   a rigid debris-collection canister secured to the body over the debris outlet to collect debris in the rigid canister and pass filtered water either back into the pool or to a remote suction system such that collected debris remains at the pool-cleaner body for easy maintenance while allowing free flow of water through the rigid canister;
   an attachment mechanism locking the rigid canister to the pool cleaner body, the attachment mechanism including (a) a connector mechanism secured to the debris outlet and defining a pair of oppositely-positioned slots and (b) a locking mechanism forming a pair of oppositely-positioned locking projections, the locking mechanism being configured to snap the projections into the corresponding slots of the connector mechanism for securely attaching the rigid canister to the pool cleaner body for operation and to withdraw the projections from the slots for detaching the rigid canister from the cleaner for emptying and pool cleaner maintenance.

13. The pool cleaner of claim 12 wherein the rigid canister includes a base portion and a cover portion connected to the base portion.

14. The pool cleaner of claim 12 wherein the locking mechanism includes a pair of locking members each including one of the locking projections, each locking member having (a) a fixed end secured to the rigid canister and (b) a free end, in a released state the locking members maintain the projections in the corresponding slots and when the free ends are pressed toward each other the projections are withdrawn from the slots thereby releasing the rigid canister from the cleaner body.

15. The pool cleaner of claim 14 wherein each of the locking members includes a finger grip at its free end for a simple finger pressing of the free ends toward each other to withdraw the projections from the slots to detach of the rigid canister from the pool-cleaner body.

16. The pool cleaner of claim 14 wherein:
   each fixed end of the locking member defines a hole therethrough; and
   a fastener stud extends through the holes and a canister wall, thereby affixing the fixed ends to the rigid canister.

17. The pool cleaner of claim 16 wherein the fastener stud has a U-like shape and includes a gripping wedge extending outwardly substantially perpendicular along each leg of the U-shaped stud and sloping to terminate at the end of the leg, the perpendicular surfaces of the wedges engaging an interior surface of the rigid canister, thereby securely mounting the locking mechanism to the rigid canister.

18. The pool cleaner of claim 12 wherein the connector mechanism includes a pair of corresponding keys, one on each of first and second connector portions, the first connector portion extending from the pool-cleaner body around the debris outlet, the second connector portion being secured to the first connector portion by interengagement of the corresponding keys which engage by rotation of the first and second connector portions.

19. The pool cleaner of claim 18 wherein the second connector portion defines the pair of oppositely-positioned slots.

20. In a swimming pool cleaner of the type movable along an underwater pool surface to clean debris therefrom, the pool cleaner including a body having a debris inlet and a debris outlet, the improvement comprising:
   the body being adapted for securement of either a water-suction hose connected to a remote suction system or a venturi-line structure connected to a water-flow line fed by a remote pump, such that the pool cleaner is interchangeably usable as a suction cleaner and as a pressure cleaner; and
   a rigid debris-collection canister secured to the body over the debris outlet to collect debris in the rigid canister and pass filtered water either back into the pool or to a remote suction system such that collected debris remains at the pool-cleaner body for easy maintenance while allowing free flow of water through the rigid canister, the rigid canister having a smooth curved shape to facilitate pool-cleaner movement in the pool and limit entrapment of the cleaner by underwater pool structures.

21. The pool cleaner of claim 20 wherein, when the pool cleaner operates as suction cleaner, the rigid debris-collection canister is configured to have a substantially sealed interior to maintain suction, the canister further including:
   a fine-mesh container connected to the debris outlet and positioned for entrapping debris in the sealed interior; and
   a connection to a suction-system hose for passing filtered water thereto.

22. The pool cleaner of claim 21 wherein the rigid debris-collection canister includes:
a base portion and a cover portion connected to the base portion; and
an o-ring gasket seal between the base and cover portions.

23. The pool cleaner of claim 20 wherein:
the rigid debris-collection canister includes a base portion and a cover portion connected to the base portion; and
when the pool cleaner operates as pressure cleaner, the cover portion is configured to have a series of open apertures for passing filtered water back into the pool, and the base portion has a solid structure to retain fine debris therein.

24. The pool cleaner of claim 23 wherein the cover portion includes a fine mesh insert positioned opposite the debris outlet to entrap fine debris such as sand and pollen.

25. The pool cleaner of claim 20 wherein the rigid canister has a debris-receiving region about the debris outlet and a debris-collecting region extending from the debris-receiving region to the rear of the pool cleaner, rigid canister being configured such that the debris flow to the rear and accumulate from the debris-collecting region toward the debris-receiving region to fill up the canister substantially uniformly and substantially free of interference with the pool-cleaner operation.

26. The pool cleaner of claim 20 further including an attachment mechanism securely locking the rigid canister to the pool cleaner body, the attachment mechanism including:
a connector mechanism secured to the debris outlet and defining a pair of oppositely-positioned slots; and
a locking mechanism forming a pair of oppositely-positioned locking projections, the locking mechanism being configured to snap the projections into the corresponding slots of the connector mechanism for securely attaching the rigid canister to the pool cleaner body for operation and to withdraw the projections from the slots for detaching the rigid canister from the cleaner for emptying and pool cleaner maintenance.

\* \* \* \* \*

UNITED STATES PATENT AND TRADEMARK OFFICE
CERTIFICATE OF CORRECTION

| | | |
|---|---|---|
| PATENT NO. | : 8,784,652 B2 | Page 1 of 1 |
| APPLICATION NO. | : 12/890069 | |
| DATED | : July 22, 2014 | |
| INVENTOR(S) | : Manuela Rief et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 705 days.

Signed and Sealed this
Twenty-fourth Day of November, 2015

Michelle K. Lee
*Director of the United States Patent and Trademark Office*